(12) United States Patent
Nakai

(10) Patent No.: US 8,269,430 B2
(45) Date of Patent: Sep. 18, 2012

(54) LIGHT-EMITTING DIODE CONTROLLER

(75) Inventor: Kazuya Nakai, Nara-ken (JP)

(73) Assignee: Texas Instruments Incorporated, Dallas, TX (US)

( * ) Notice: Subject to any disclaimer, the term of this patent is extended or adjusted under 35 U.S.C. 154(b) by 275 days.

(21) Appl. No.: 12/696,246

(22) Filed: Jan. 29, 2010

(65) Prior Publication Data

US 2010/0219773 A1 Sep. 2, 2010

(30) Foreign Application Priority Data

Jan. 30, 2009 (JP) ................................ 2009-019934

(51) Int. Cl.
*H05B 37/02* (2006.01)
(52) U.S. Cl. ...................... 315/307; 315/185 R; 315/312
(58) Field of Classification Search .............. 315/185 R, 315/291, 294, 297, 307, 312; 345/82, 102, 345/212

See application file for complete search history.

(56) References Cited

U.S. PATENT DOCUMENTS

| | | | |
|---|---|---|---|
| 7,893,626 B2 * | 2/2011 | Liu | 315/185 R |
| 2006/0256050 A1 * | 11/2006 | Ikeda | 345/82 |
| 2009/0189548 A1 * | 7/2009 | Hoffman et al. | 315/307 |
| 2009/0261743 A1 * | 10/2009 | Chen et al. | 315/192 |
| 2009/0295775 A1 * | 12/2009 | Kim et al. | 345/212 |
| 2010/0072922 A1 * | 3/2010 | Szczeszynski et al. | 315/297 |

FOREIGN PATENT DOCUMENTS

JP 09-292860 11/1997

* cited by examiner

*Primary Examiner* — Tung X Le
(74) *Attorney, Agent, or Firm* — John J. Patti; Wade J. Brady, III; Frederick J. Telecky, Jr.

(57) ABSTRACT

Light-emitting diode controller 10 contains voltage source circuit 33 for feeding voltage to the anode of light-emitting diode 13, current source circuit 34 that selectively feeds current to the cathode of light-emitting diode 13, first voltage detector 36 that compares the cathode voltage of light-emitting diode 13, connected to current source circuit 34, to a first reference voltage, second voltage detector 37 that compares the cathode voltage to a second reference voltage lower than said first reference voltage, and voltage controllers 32, 35 that control the voltage value of the voltage fed from current source circuit 34. Here, voltage controllers 32, 35 control voltage source circuit 33 so that the voltage fed by current source circuit 34 is in the range between the first reference voltage and the second reference voltage.

15 Claims, 19 Drawing Sheets

LIGHT-EMITTING DIODE CONTROLLER

CROSS-REFERENCE TO RELATED APPLICATIONS

This application is claims priority from Japanese Patent Application No. 2009-019934, filed Jan. 30, 2009, which is hereby incorporated by reference in its entirety for all purposes.

FIELD OF THE INVENTION

The invention pertains to a light-emitting diode controller. More specifically, the invention pertains to a light-emitting diode controller that uses a voltage source circuit and a current source circuit to control light emission of a light-emitting diode.

BACKGROUND OF THE INVENTION

The LED display device of Patent reference 1 has a panel of plural LEDs (hereinafter to be referred to as light-emitting diodes) arranged in an array configuration, a common driver connected to the plural light-emitting diodes by line wires, and a constant-current driver (constant current source) connected to the plural light-emitting diodes by means of row lines (see FIG. 1).

A power supply voltage is fed from the common driver to light-emitting diodes selected by means of the line wires and row lines, and a preset constant current flows by means of the constant current driver.

The luminance of a light-emitting diode with the voltage applied to it can be controlled by adjusting either the magnitude (amplitude) of the current flowing in the light-emitting diode or the power ON time.

Consequently, by feeding power corresponding to the duty to a light-emitting diode connected to the constant current source, the light-emitting diode can emit light at an appropriate luminance corresponding to the duty.

For a light-emitting diode, when a current flows in the forward direction from the anode to the cathode, light is emitted. In this case, a fall in voltage takes place in the forward direction of the light-emitting diode. Consequently, the light-emitting diode emits light at a luminance corresponding to the amplitude of the current or the power ON time. Consequently, it is necessary to apply a voltage to the light-emitting diode higher than the fall in voltage in the forward direction of the light-emitting diode.

When plural light-emitting diodes are connected in series, it is necessary to apply a voltage to the plural light-emitting diodes higher than the sum of the forward drops in voltage generated in the forward direction of the plural light-emitting diodes.

The fall in voltage of a light-emitting diode is different for different elements continuously manufactured due to dispersion in manufacturing. The temperature characteristics of a light-emitting diode are also different for different elements actually manufactured.

Consequently, the fall in voltage in the forward direction is smaller for some light-emitting diodes, and it is larger for some light-emitting diodes.

As a result, for an actually manufactured LED display device, it is assumed that the fall in voltage in the forward direction is maximum, and a power supply voltage higher than the assumed voltage is fed from the common driver to the light-emitting diode.

On the other hand, for an actually manufactured LED display device, the fall in voltage in the forward direction of the light-emitting diode may be smaller than that assumed voltage.

Here, if the light-emitting diode actually used has a small fall in voltage in the forward direction of the light-emitting diode, an excessively high voltage is applied on the light-emitting diode.

Also, due to the excessively high voltage, excess power is consumed and excess heat is generated in the LED display device.

The following listed equation 1 is for computing the excess power. In equation 1, P(Loss) represents the excessively consumed power, Vf(max) represents the maximum value of the fall in voltage in the forward direction of the light-emitting diode due to dispersion in manufacturing, Vf(min) represents the minimum value of the fall in voltage in the forward direction of the light-emitting diode, N represents the number of light-emitting diodes connected in series, and I represents the current flowing in the light-emitting diodes.

$$P(\text{Loss})=(Vf(\max)-Vf(\min))\times N\times 1 \quad \text{Equation 1}$$

SUMMARY OF INVENTION

A general object of the present invention provides a light-emitting diode controller that can decrease unnecessary power consumption resulting from manufacturing dispersion or the temperature characteristics of the light-emitting diode.

This and other objects and features of the light-emitting diode controller of the invention has the following parts: a voltage source circuit that feeds a voltage to the anode of a light-emitting diode, a current source circuit that selectively feeds a current to the cathode of the light-emitting diode, a first voltage detector that compares the cathode voltage of the light-emitting diode connected to the current source circuit to a first reference voltage, a second voltage detector that compares the cathode voltage to a second reference voltage lower than the first reference voltage, and a voltage controller that controls the value of the voltage fed by the voltage source circuit. Here, the voltage controller controls the voltage source circuit so that the voltage fed by the voltage source circuit is between the first reference voltage and the second reference voltage.

An aspect of the invention can decrease waste in power consumption resulting from manufacturing dispersion or the temperature characteristics of the light-emitting diode.

The foregoing has outlined rather broadly the features and technical advantages of the invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawings, in which.

REFERENCE NUMERALS AND SYMBOLS AS SHOWN IN THE DRAWINGS

In the figures, 10 represents a light-emitting diode controller, 13 represents a light-emitting diode, 32 represents a DA converter (a portion of the voltage controller), 33 represents a voltage source circuit, 34 represents a current source circuit, 35 represents an output voltage controller (a portion of the voltage controller), 36 represents an adjustment voltage detector (first voltage detector), 37 represents a lower limit voltage detector (second voltage detector), 41 represents a data interface part, 42 represents a display timing controller (light emission controller), 72, 73, and 74 represent current output transistors (current detecting elements), 82-1, 82-2, and 82-3 represent converters (detectors), 92-1, 92-2, and a 92-3 represent converters (detectors), 102 represents an up/down counter (control value generator), 111 represents an abnormal voltage detector (third voltage detector), 121 represents an adder (adder), and 122 represents a selector.

DETAILED DESCRIPTION

Figure 1:
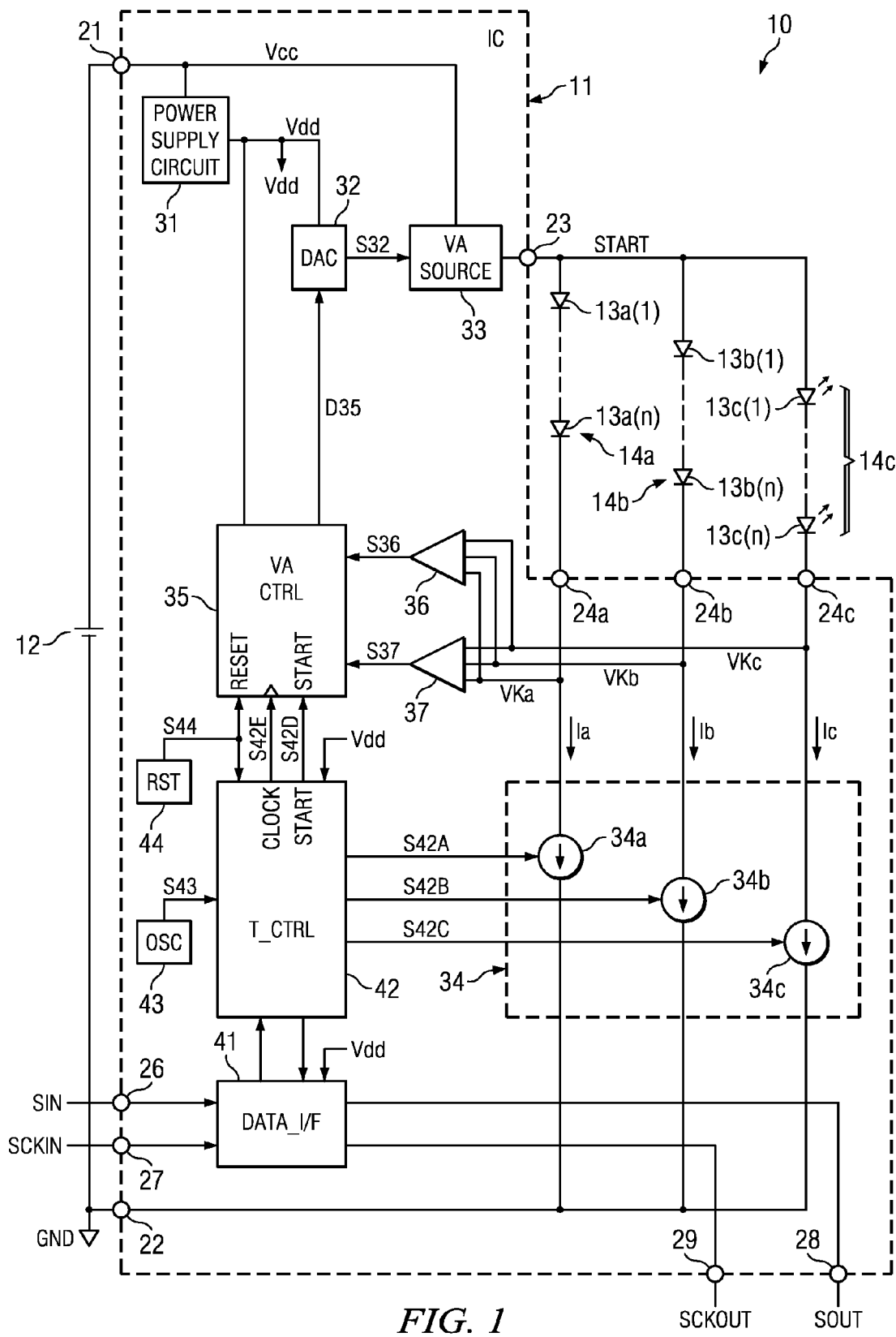
FIG. 1 is a schematic block diagram illustrating the light-emitting diode controller in accordance with an embodiment of the invention.

FIG. 1 is a schematic block diagram illustrating light-emitting diode controller 10. As shown in FIG. 1, light-emitting diode controller 10 has integrated circuit 11, power supply 12, and a plurality, e.g., n, light-emitting diodes 13a1-13an, 13b1-13bn, 13c1-13cn. Here, n represents a natural number of 1 or larger.

As input/output terminals, integrated circuit 11 has power supply terminal 21, ground terminal 22, anode terminal 23, three cathode terminals 24a, 24b, 24c, shift data input terminal (SIN) 26, shift clock input terminal (SCKIN) 27, shift data output terminal (SOUT) 28, and shift clock output terminal (SCKOUT) 29.

Here, each of shift data input terminal 26, shift clock input terminal 27, shift data output terminal 28, and shift clock output terminal 29 may have a pair of terminals, and a difference signal is input to each pair of terminals.

The power supply 12 is connected between power supply terminal 21 and ground terminal 22. Here, power supply 12 is applied as power supply voltage Vc of, e.g., a 24 volt voltage with respect to power supply terminal 21. Also, the power supply voltage Vcc may be 12 V, 48 V, etc.

Plural light-emitting diodes 13a1-13an are connected in series. Plural light-emitting diodes 13b1-13bn and plural light-emitting diodes 13c1-13cn are also connected in series. As a result, three light-emitting diode columns 14a, 14b, 14c are formed each consisting of n light-emitting diodes connected in series.

The anode at the top of the light-emitting diode column 14a is connected to anode terminal 23, and the cathode at the bottom of the column is connected to cathode terminal 24a.

The anode at the top of the light-emitting diode column 14b is connected to anode terminal 23, and the cathode at the bottom of the column is connected to cathode terminal 24b.

The anode at the top of the light-emitting diode column 14c is connected to anode terminal 23, and the cathode at the bottom of the column is connected to cathode terminal 24c.

In the following, light-emitting diodes 13a1-13an, light-emitting diodes 13b1-13bn and light-emitting diodes 13c1-13cn en bloc are called light-emitting diodes 13.

Also, the light-emitting diode columns 14a, 14b, 14c en bloc are called light-emitting diode columns 14.

Also, cathode terminals 24a, 24b, 24c en bloc are called cathode terminals 24.

Plural light-emitting diodes 13 forming the light-emitting diode columns 14a, 14b, 14c may emit the same color of light, or different colors of light. For example, the three light-emitting diode columns 14a, 14b, 14c may be a combination of a column emitting red light, a column emitting blue light, and a column emitting green light. As another scheme, each light-emitting diode column 14 may be a combination of light-emitting diodes 13 emitting different colors of light.

Here, the number n of light-emitting diodes 13 in each light-emitting diode column 14 may be the same or different for all light-emitting diode columns 14a, 14b, 14c.

Here, there may be two or more anode terminals 23 of integrated circuit 11.

There may be one, two, four or more cathode terminals 24.

There may be two or more light-emitting diode columns 14 connected between one anode terminal 23 and one cathode terminal 24.

As another scheme that may be adopted, light-emitting diode columns 14 are connected to some of the three cathode terminals 24, and light-emitting diode columns 14 are not connected to the remaining cathode terminals 24.

In addition, one light-emitting diode 13 may be connected between anode terminal 23 and cathode terminal 24.

As the internal circuit, integrated circuit 11 has power supply circuit 31, DA (Digital to Analog) converter (DAC) 32, voltage source circuit (VA_SOURCE) 33, current source circuit 34, output voltage controller (VA_CTRL) 35, adjustment voltage detector 36, lower limit voltage detector 37, data interface part (DATA_I/F) 41, display timing controller (T_CTRL) 42, oscillator (OSC) 43, and reset circuit (RST) 44.

The power supply circuit 31 is connected to power supply terminal 21. The power supply circuit 31 generates internal power supply voltage Vdd from power source voltage Vcc input to power supply terminal 21.

The internal power supply voltage Vdd is fed to DA converter 32, current source circuit 34, output voltage controller 35, adjustment voltage detector 36, lower limit voltage detector 37, data interface part (I/F part) 41, display timing controller 42, oscillator 43, and reset circuit 44.

Figure 2:
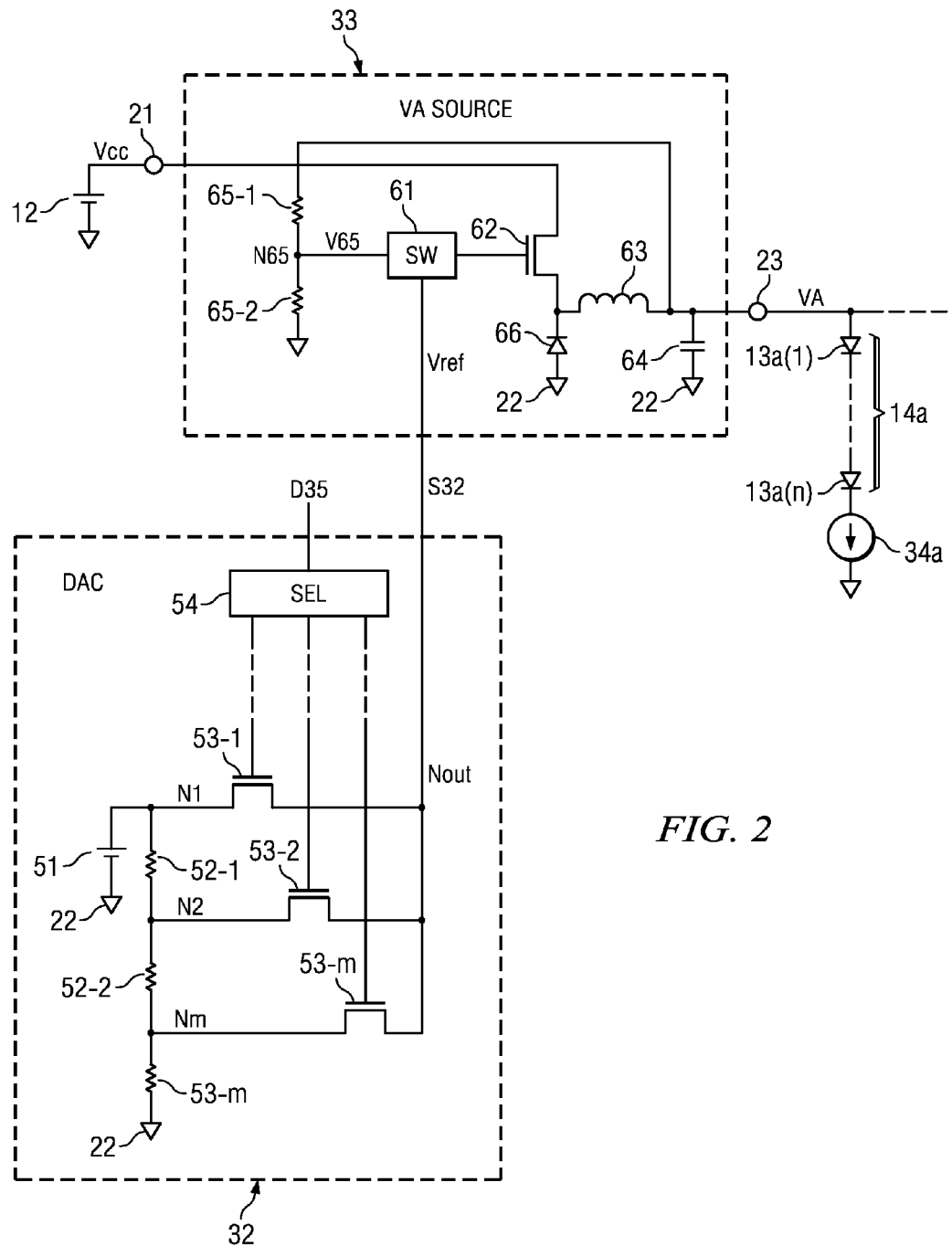
FIG. 2 is a circuit diagram illustrating an example of the DA converter and voltage source circuit shown in FIG. 1.

FIG. 2 is a circuit diagram illustrating an example of DA converter 32 (DAC) and voltage source circuit 33 (VA_SOURCE) of FIG. 1.

Here, DA converter 32 (DAC) has voltage generator 51, m resistors 52-1 to 52-m, m transistors 53-1 to 53-m, and selector 54. Here, m is a natural number of 2 or larger.

The m resistors 52-1 to 52-m are connected in series. Also, all m resistors 52-1 to 52-m are connected to voltage generator 51.

Plural nodes N1-Nm between voltage generator 51 and plural resistors 52 are connected to the sources of m transistors 53-1 to 53-m.

The gates of the m transistors 53-1 to 53-m are connected to selector 54.

The drains of m transistors 53-1 to 53-m are connected to one node Nout. The voltage level of node Nout becomes the voltage level of output signal S32 of DA converter 32.

Here, voltage generator 51 of DA converter 32 generates reference voltage V51.

The m resistors 52-1 to 52-m connected in series function to divide the voltage for reference voltage V51 at the ratio of the resistances. As a result, plural nodes N2-Nm receive voltages prepared by dividing reference voltage V51.

Also, control value D35 is input to selector 54. The control value D35 is the value of instruction of anode voltage VA generated by output voltage controller 35.

Corresponding to control value D35, the selector 54 controls to turn on one of the plural transistors 53-1 to 53-m, while turning off all of the remaining transistors 53-1 to 53-m. The selector 54 selects one node from plural nodes N1-Nm.

As a result, DA converter 32 outputs the voltage of the node selected by selector 54 based on control value D35 as an analog voltage. This analog voltage is input as reference voltage Vref to voltage source circuit 33.

The voltage source circuit (VA_SOURCE) 33 is a switching power supply. It has switching controller 61, transistor 62, coil 63, diode 66, capacitor 64, and two voltage-dividing resistors 65-1 and 65-2. The voltage source circuit 33 outputs anode voltage VA to anode terminal 23.

The drain of transistor 62 is connected to power supply terminal 21, and its source is connected to one terminal of coil 63 and the cathode of diode 66.

The anode of diode 66 is connected to ground terminal 22.

The other terminal of coil 63 is connected to anode terminal 23.

The capacitor 64 is connected between anode terminal 23 and ground terminal 22.

Two voltage-dividing resistors 65-1 and 65-2 are connected in series. All of the resistors are connected between anode terminal 23 and ground terminal 22.

The switching controller 61 controls the gate of transistor 62.

In voltage source circuit 33, anode voltage VA is divided by two voltage-dividing resistors 65-1 and 65-2. The voltage at node N65 between the two voltage-dividing resistors 65-1 and 65-2 becomes voltage V65 as a division of anode voltage VA.

The switching controller 61 compares divided voltage V65 at node N65 to the voltage of output signal S32 of DA converter 32 (reference voltage Vref), and it controls switching of the gate of transistor 62 corresponding to the comparison result.

Here, for example, when divided voltage V65 is lower than the voltage of output signal S32 of DA converter 32 (reference voltage Vref), the duty ratio of ON/OFF of transistor 62 is controlled so that the current fed to anode terminal 23 increases.

On the other hand, when divided voltage V65 is higher than the voltage of output signal S32 of DA converter 32 (reference voltage Vref), the duty ratio of ON/OFF of transistor 62 is controlled so that the current fed to anode terminal 23 decreases.

Here, for voltage source circuit 33, capacitor 64 is charged such that divided voltage V65 obtained by dividing anode voltage VA becomes equal to the output voltage of DA converter 32 (reference voltage Vref).

Then, voltage source circuit 33 outputs anode voltage VA represented by the following equation 2 to anode terminal 23. In following equation 2, R1 represents the resistance of voltage dividing resistor 65-1, R2 represents the resistance of voltage dividing resistor 65-2, and V65 represents divided voltage V65.

$$VA = (R1+R2) \times V65 \div R2 \qquad \text{Equation 2}$$

Figure 3:
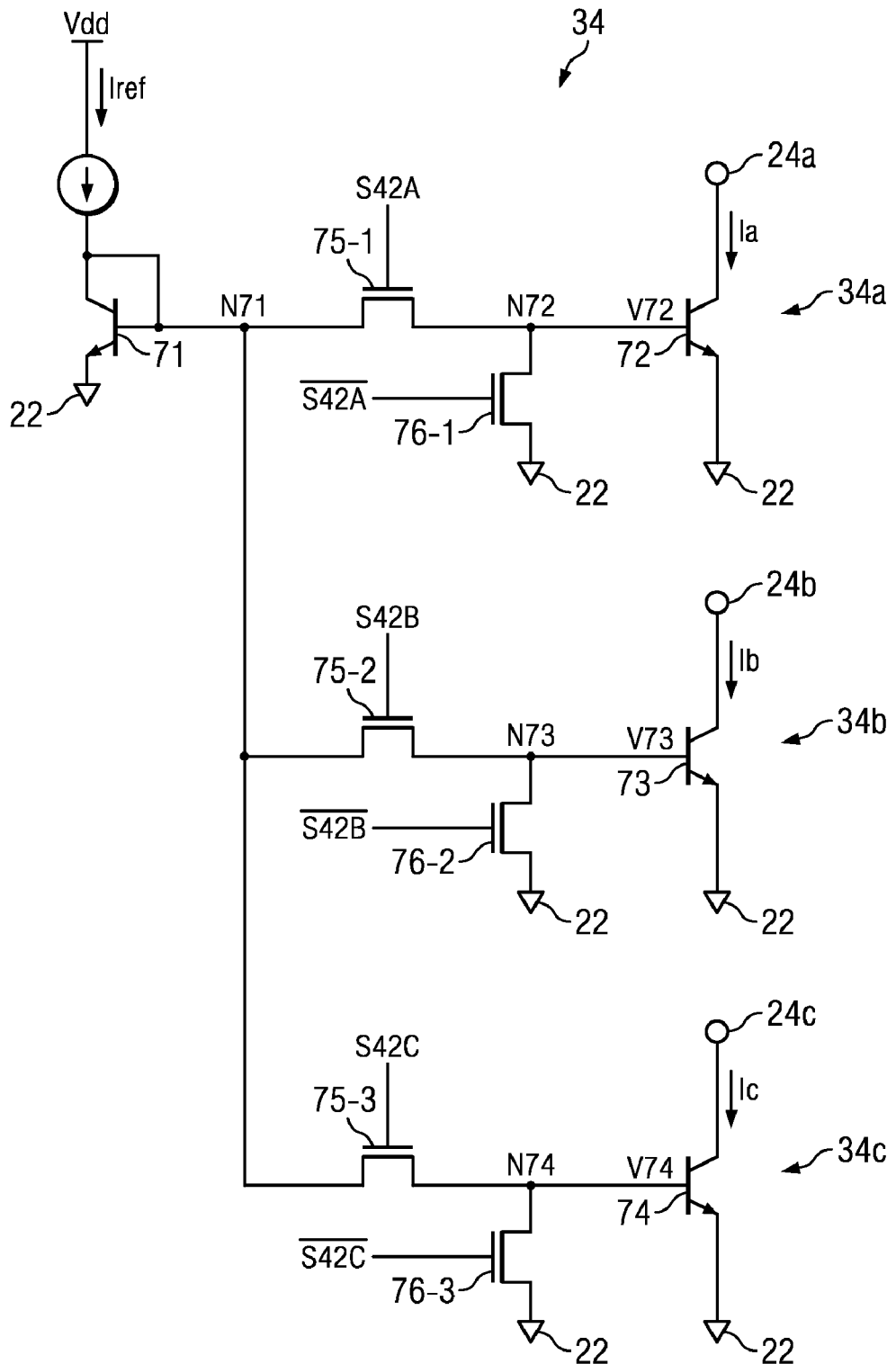
FIG. 3 is a circuit diagram illustrating an example of the current source circuit shown in FIG. 1.

FIG. 3 is a circuit diagram illustrating an example of current source circuit 34 in FIG. 1.

The current source circuit 34 is connected to three cathode terminals 24a, 24b, 24c, and display timing controller 42.

As shown in FIG. 3, basically, current source circuit 34 is formed as a current mirror circuit. It has the following parts: one npn transistor 71, three npn transistors 72-74 as current output transistors, three ON transistors 75-1, 75-2, 75-3 that turn on the transistors 72-74, and three OFF transistors 76-1, 76-2, 76-3 that turn off the transistors 72-74.

That is, current source circuit 34 is ON/OFF-function-equipped current source circuit 34. Here, the number of transistors 72-74 is the same as that of cathode terminals 24.

The collector of the transistor 71 is connected to current source I, the emitter is connected to ground terminal 22, and the base is connected to the collector.

Consequently, transistor 71 functions as a diode.

The collectors of the transistors 72-74 are connected to three cathode terminals 24a, 24b, 24c, their emitters are connected to ground terminal 22, and their bases are connected to the drains of three ON transistors 75-1 to 75-3, respectively.

The sources of ON transistors 75-1 to 75-3 are connected to node N71 connected to the base of transistor 71 that functions as a diode.

Also, the drains of OFF transistors 76-1 to 76-3 are connected to nodes N72, N73, N74 connected to the bases of transistors 72-74, and their sources are connected to ground terminal 22.

Consequently, for example, when the gate of ON transistor 75-1 is controlled to the high level so that ON transistor 75-1 is turned on, and the gate of OFF transistor 76-1 is controlled to the low level so that OFF transistor 76-2 is turned off, base N72 of transistor 72 is connected via ON transistor 75 to base N71 of transistor 71 that functions as a diode.

As a result, transistor 72 and transistor 71 form a current mirror circuit.

Here, current Ia identical to collector current Iref of transistor 71 that functions as a diode, or current Ia of twice the collector current Iref, flows in the collector of transistor 72 and cathode terminal 24a.

Conversely, when the gate of ON transistor 75-1 is controlled to the low level and ON transistor 75-1 is turned off, and the gate of OFF transistor 76-1 is controlled to the high level and OFF transistor 76-1 is turned on, base N72 of transistor 72 is pulled down via OFF transistor 76-1.

By means of the pull-down, transistor 72 enters the off state.

Also, current Ia does not flow in the collector of transistor 72 and cathode terminal 24a.

The same is true for the relationship between the ON/OFF control state of ON transistor 75-2 and OFF transistor 76-2 and current Ib in the collector of transistor 73 and cathode terminal 24b, and the relationship between the ON/OFF control state of ON transistor 75-3 and OFF transistor 76-3 and current Ic of the collector of transistor 74 and cathode terminal 24c.

The constant current source circuit 34 functions as constant current sources 34a, 34b, 34c formed as three groups of current mirror circuits.

The voltage source circuit 33 is connected to the anode of light-emitting diode 13a1 at the upper end of light-emitting diode column 14, and current source circuit 34 with an ON/OFF function is connected to the cathode of light-emitting diode 13an at the lower end of the light-emitting diode column. As a result, it is possible to turn on/off the current flowing in light-emitting diode 13 stably and quickly. Consequently, light-emitting diode 13 can be turned on/off with high stability.

Figure 4:
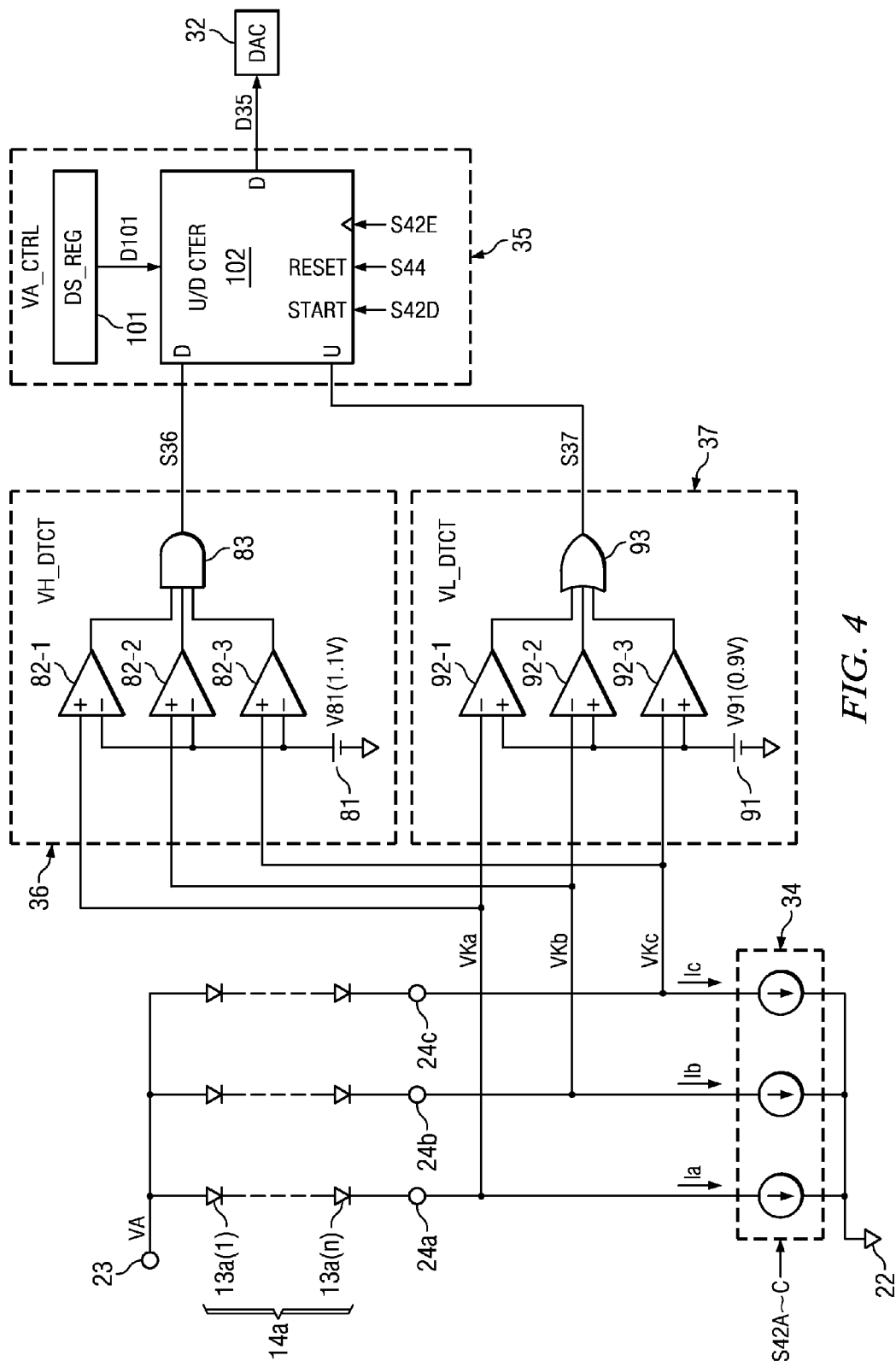
FIG. 4 is a circuit diagram illustrating an example of the circuit of the control value generating system shown in FIG. 1.

FIG. 4 is a circuit diagram illustrating an example of the circuit of the control value generation system shown in FIG. 1.

Shown in FIG. 4 are adjustment voltage detector (VH_DTCT) 36, lower limit voltage detector (VL_DTCT) 37, and output voltage controller (VA_CTRL) 35 in FIG. 1.

The adjustment voltage detector (VH_DTCT) 36 has voltage generator 81, three comparators 82-1, 82-2, 82-3 and AND circuit 83.

For voltage generator 81 of adjustment voltage detector 36, it is only required that it generate a voltage at least a little higher than base voltages V71, V72, V73 (hereinafter to be referred to as the voltages of the control terminals (nodes N72-N74) of transistors 71, 72, 73 of current source circuit 34. When power is on, the voltage at control terminals N72 to N74 is about 0.7 V. Consequently, voltage generator 81 may generate an adjustment reference voltage V81 of 1.1 V.

The number of comparators 82-1 to 82-3 of adjustment voltage detector 36 may be identical to that of cathode terminals 24a-24c.

The inverted input terminals of comparators 82-1, 82-2, 82-3 are connected commonly to voltage generator 81. The non-inverted input terminals are respectively connected to cathode terminals 24a-24c.

For comparators 82-1 to 82-3, when cathode voltages VKa-VKc input to them are higher than adjustment reference voltage V81, the comparators output a high level signal, and, when they are lower than the adjustment reference voltage, the comparators output a low level signal.

The comparators 82-1 to 82-3 of adjustment voltage detector 36 are connected to AND circuit 83.

For the AND circuit 83, when the output signals of the three comparators 82-1 to 82-3 are on the high level, it outputs a high level signal. Otherwise, it outputs a low level signal.

Consequently, for adjustment voltage detector 36, when the three cathode voltages VKa-VKc are higher than adjustment reference voltage V81 (such as 1.1 V), high level signal S36 is output.

Also, for adjustment voltage detector 36, when any one of the three cathode voltages VKa-VKc is lower than adjustment reference voltage V81 (such as 1.1 V), it outputs low level signal S36.

The lower limit voltage detector (VL_DTCT) 37 has voltage generator 91, three comparators 92-1, 92-2, 92-3, and OR circuit 93.

For voltage generator 91 of lower limit voltage detector 37, it is only required that it generate voltage V91 between voltages V72-V74 of the control terminals of current source circuit 34 and adjustment reference voltage V81.

When power is on, voltages V72-V74 of the control terminals of current source circuit 34 may be about 0.7 V.

Also, for example, adjustment reference voltage V81 is about 1.1 V.

In this case, for voltage generator 91, it is only required that lower limit reference voltage V91 of, e.g., 0.9 V, be generated.

The number of comparators 92-1 to 92-3 of lower limit voltage detector 37 may be identical to the number of cathode terminals 24a-24c.

The non-inverted input terminals of comparators 92-1 to 92-3 are commonly connected to voltage generator 91. The inverted input terminals are respectively connected to cathode terminals 24a-24c.

For the comparators 92-1 to 92-3, when cathode voltages VKa-VKc are lower than lower limit reference voltage V91, they output a high level signal, and when the voltages are higher than the lower limit reference voltage, they output a low level signal.

The comparators 92-1 to 92-3 of lower limit voltage detector 37 are connected to OR circuit 93.

For the OR circuit 93, when all the output signals of three comparators 92 are on the low level, it outputs a low level signal. Otherwise, it outputs a high level signal.

Consequently, for lower limit voltage detector 37, when at least one of three cathode voltages VKa-VKc is lower than lower limit reference voltage V91 (e.g., 0.9 V), it outputs high level signal S37.

Also, for lower limit voltage detector 37, when all three cathode voltages VKa-VKc are higher than lower limit reference voltage V91 (e.g., 0.9 V), it outputs low level signal S37.

The output voltage controller (VA_CTRL) 35 has reference value register 101 and up/down counter 102.

The reference value register 101 stores a control value.

The control value stored in reference value register 101 has a value corresponding to anode voltage VA at which currents Ia-Ic needed for light emission flow in all light-emitting diode columns 14.

Especially, the control value stored in reference value register 101 may have a value corresponding to anode voltage VA that allows flowing of currents Ia-Ic needed for light emission even if the fall in voltage varies corresponding to the manufacturing dispersion of light-emitting diode 13 and the environmental temperature (or the operating temperature range).

More specifically, reference value register 101 is only required to store a control value corresponding to anode voltage VA, obtained by adding voltages V72-V74 of the control terminal of current source circuit 34 to the maximum fall in voltage generated in the three light-emitting diode columns 14.

Here, a control value corresponding to the voltage obtained by further adding a voltage margin to anode voltage VA may be stored in reference value register 101.

The maximum fall in voltage generated in one light-emitting diode column 14 may be computed using the following equation 3.

In equation 3, Vf(max) represents the maximum value of the fall in voltage of light-emitting diode 13 in consideration of the manufacturing dispersion and the environmental temperature (operating temperature range), n represents the number of light-emitting diodes 13 connected in series, and Vf(total) represents the maximum fall in voltage generated in one light-emitting diode column 14.

$$Vf(total) = Vf(max) \times n \qquad \text{Equation 3}$$

If a control value corresponding to Vf(total) in equation 3 is stored in reference value register 101, even if the maximum fall in voltage Vf(max) is generated in the three light-emitting diode columns 14, a necessary voltage can still be applied on the three light-emitting diode columns 14, and currents Ia-Ic can flow in plural light-emitting diodes 13.

When reset signal S44 is input, the control value read from reference value register 101 is read by up/down counter 102 as the initial value. Also, when start signal S42D is input, control value D102 read from reference value register 101 is output by up/down counter 102 to DA converter 32.

Consequently, the output value of up/down counter 102 becomes control value D35 output from output voltage controller 35.

Here, after a start signal is input, when down input D from adjustment voltage detector 36 becomes high level, up/down counter 102 decreases the control value in synchronization with clock signal S42E.

Also, when up input U from lower limit voltage detector 37 becomes high level, up/down counter 102 raises the control value in synchronization with clock signal S42E.

Figure 5:
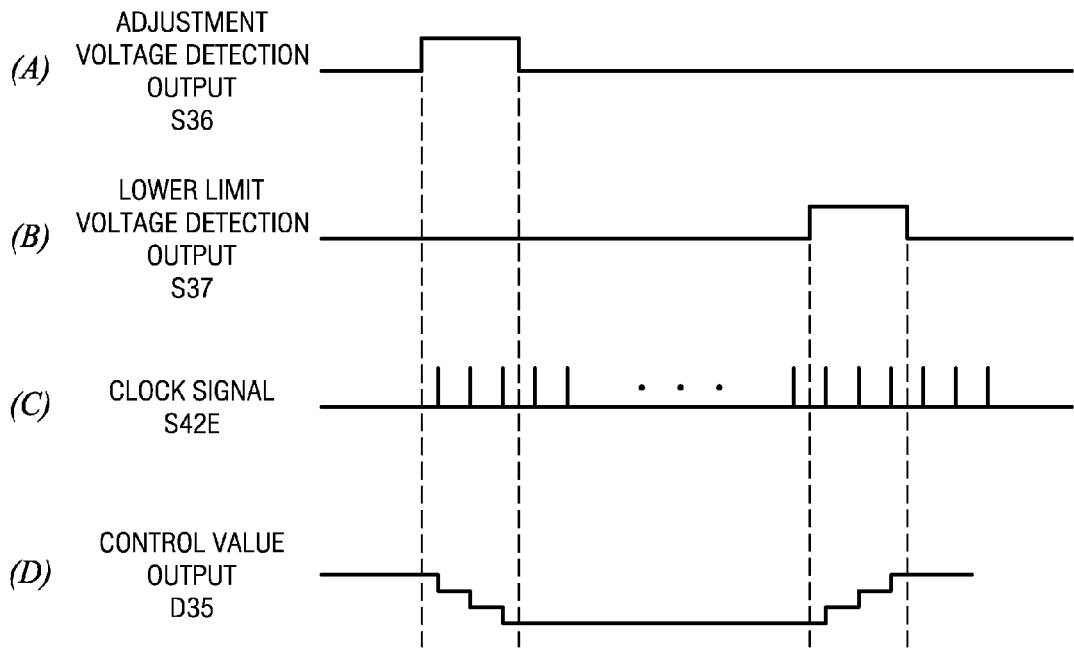
FIG. 5 is a time chart illustrating the signal waveforms of the various parts shown in FIG. 4.

FIG. 5 is a time chart illustrating signal waveforms at the various parts shown in FIG. 4.

FIG. 5(A) shows the signal waveform of detection signal S36 of adjustment voltage detector 36, FIG. 5(B) shows the waveform of detection signal S37 of lower limit voltage detector 37, FIG. 5(C) shows the waveform of clock signal S42E input to up/down counter 102, and FIG. 5(D) shows the waveform corresponding to control value D35 output from up/down counter 102.

During the period when detection signal S36 of adjustment voltage detector 36 shown in FIG. 5(A) is on the high level, each time that clock signal S42E shown in FIG. 5(C) is input, control value D35 of up/down counter 102 shown in FIG. 5(D) is decreased by 1 step.

Also, during the period in which detection signal S37 of lower limit voltage detector 37 shown in FIG. 5(B) is on the high level, each time that clock signal S42E shown in FIG. 5(C) is input, control value D35 of up/down counter 102 shown in FIG. 5(D) is increased by 1 step.

The width of one step can be 1 or 2 or more.

Also, by selecting the period of clock signal S42E appropriately, it is possible to ensure that the feedback control system does not oscillate.

In the following, the overall light emission control of light-emitting diode controller 10 as shown in FIGS. 1-4 will be explained.

Figure 6:
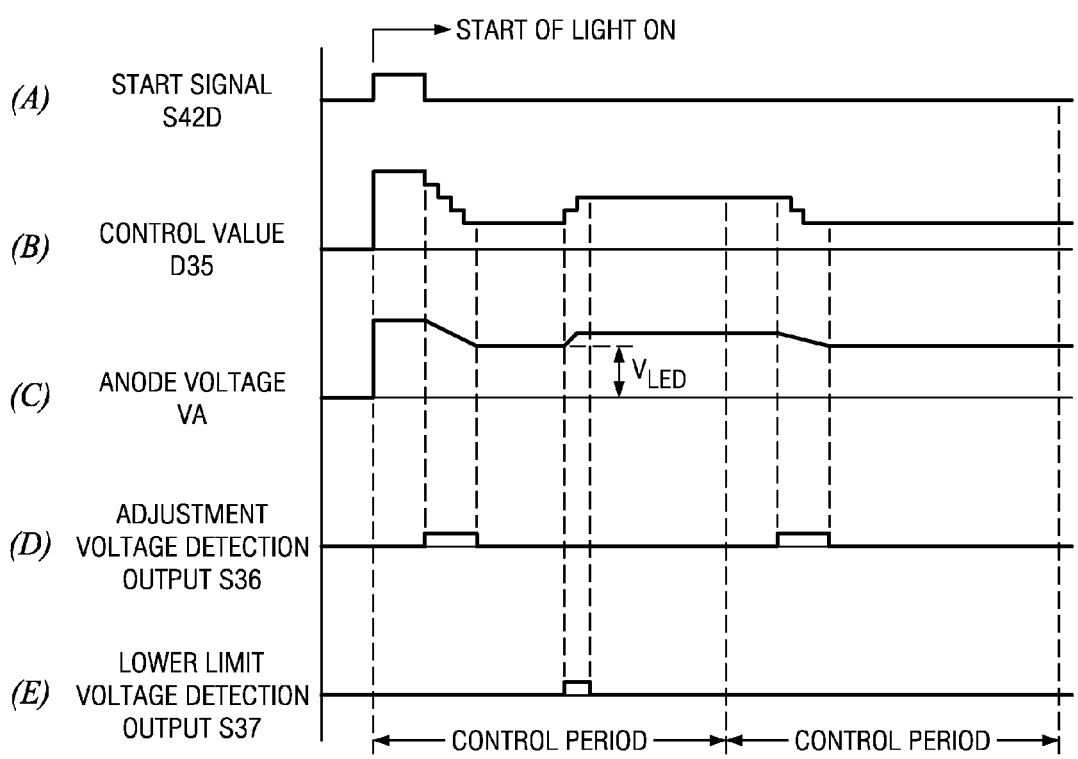
FIG. 6 is a time chart illustrating an example of anode voltage control in the light-emitting diode controller shown in FIG. 1.

FIG. 6 is a time chart illustrating an example of anode voltage control in the light-emitting diode controller 10 shown in FIG. 1.

FIG. 6(A) shows the waveform of start signal S42D output from display timing controller 42 to up/down counter 35, FIG. 6(B) shows the waveform corresponding to control value D35 output from up/down counter 102, FIG. 6(C) shows the waveform of anode voltage VA, FIG. 6(D) shows the waveform of detection signal S36 of adjustment voltage detector 36, and FIG. 6(E) shows the waveform of detection signal S37 of lower limit voltage detector 37.

Here, the time chart shown in FIG. 6 is a time chart when control of light ON is started for light emission of light-emitting diode 13 with a prescribed luminance.

When light-emitting diode 13 is turned on to emit light, as shown in FIG. 6(A), at the timing of start of light ON control, display timing controller 42 outputs start signal S42D to up/down counter 35.

When start signal S42D is input, as shown in FIG. 6(B), up/down counter 102 outputs control value D35 to DA converter 32. The control value D35 at the start of light emission is control value D35 stored in reference value register 101.

The DA converter 32 outputs an analog voltage corresponding to control value D35. With this analog voltage taken as reference voltage Vref, voltage source circuit 33 generates anode voltage VA corresponding to the reference voltage as shown in FIG. 6(C).

Also, in each control period, display timing controller 42 outputs constant current ON/OFF signals S42a-S42c with a duty corresponding to the luminance.

For current source circuit 34, when the constant current ON/OFF signals S42a-S42c are input, ON transistors 75-1 to 75-3 become ON, and OFF transistors 76-1 to 76-3 become OFF. In current source circuit 34, three groups of current mirror circuits are formed, and current source circuit 34 enters a state in which power can be turned on.

As explained above, when light ON is started, anode voltage VA based on control value D35 stored in reference value register 101 is applied on three light-emitting diode columns 14. Also, by means of constant current ON/OFF signals S42a-S42c, a current mirror circuit for constant current sources 34a-34c is formed in current source circuit 34.

As a result, currents Ia-Ic flow in three light-emitting diode columns 14. Plural light-emitting diodes 13 emit light.

Then, in the initial control period, after the passage of the period with the duty corresponding to the luminance, display timing controller 42 controls constant current ON/OFF signals S42a-S42c to the low level.

As a result, ON transistors 75-1 to 75-3 of current source circuit 34 becomes the OFF state, and OFF transistors 76-1 to 76-3 become the ON state. As a result, a current mirror circuit is not formed in current source circuit 34.

Consequently, although anode voltage VA is applied on three light-emitting diode columns 14, current does not flow in plural light-emitting diodes 13. Plural light-emitting diodes 13 are turned off.

Then, during each control period, display timing controller 42 controls so that constant current ON/OFF signals S42a-S42c become high level during the period of the duty corresponding to the luminance. In current source circuit 34, a current mirror circuit is formed for constant current sources 34a-34c.

As a result, in each control period, plural light-emitting diodes 13 emit light corresponding to the duty. As a result, for plural light-emitting diodes 13, in each control period, the power ON current is subjected to PWM (pulse width modulation), and light is emitted corresponding to the duty.

For plural light-emitting diodes 13, light emission is controlled for each of light-emitting diode columns 14a-14c. In this case, the information of the duty is received as shift data from another light-emitting diode controller 10 not shown in the figure by data interface part 41 in FIG. 1.

While control is executed on light emission of plural light-emitting diodes 13 at the luminance of the shift data, display timing controller 42 outputs clock signal S42E to up/down counter 102. More specifically, display timing controller 42 outputs clock signal S42E to up/down counter 102 only during the light ON period (period of duty) for light ON of light-emitting diode 13.

Here, when anode voltage VA increases, and detection signal S36 of adjustment voltage detector 36 becomes high level as shown in FIG. 6(D), up/down counter 102 decreases control value D35 as shown in FIG. 6(B) each time that clock signal S42E is input.

As shown in FIG. 6(C), when control value D35 decreases, anode voltage VA generated by voltage source circuit 33 decreases correspondingly.

With this control, no cathode voltages VKa-VKc exceed 1.1 V.

Consequently, the difference in potential between cathode voltages VKa-VKc and voltages V72-V73 of the control terminals of current source circuit 34 decreases.

Also, when anode voltage VA is low, and detection signal S37 of lower limit voltage detector 37 becomes high level as shown in FIG. 6(E), as shown in FIG. 6(B), up/down counter 102 increases control value D35 each time that clock signal S42E is input.

When control value D35 is increased, as shown in FIG. 6(C), anode voltage VA generated by voltage source circuit 33 also rises correspondingly.

Under control of the anode voltage VA, none of cathode voltages VKa-VKc falls below, e.g., 0.9 V.

Consequently, it is possible to guarantee a minimum potential difference as the potential difference between cathode voltages VKa-VKc and voltages V72-V73 of the control terminals of current source circuit 34.

As a result, currents Ia, Ib, Ic flow in light-emitting diode columns 14a-14c, and light is emitted at the desired luminance in light-emitting diode columns 14a-14c.

As explained above, up/down counter 35 generates control value D35 that is refreshed corresponding to detection by adjustment voltage detector 36. The DA converter 32 transforms control value D35 to reference voltage Vref. The transistor 62 for voltage regulation of voltage source circuit 33 generates anode voltage VA corresponding to reference voltage Vref. Here, voltage source circuit 33 decreases anode voltage VA.

Consequently, even with manufacturing dispersion in the characteristics of plural light-emitting diodes 13, it is possible to decrease anode voltage VA along with the fall in voltage in the forward direction determined corresponding to the combination of plural light-emitting diodes 13 actually in use.

That is, it is possible to decrease anode voltage VA so that when all cathode voltages VKa-VKc are over adjustment reference voltage V81, it is not detected by adjustment voltage detector 36.

The potential difference between voltages V72-V74 of current source circuit 34 and cathode voltages VKa-VKc is decreased, and waste in power consumption is suppressed. Also, under control with suppressed power consumption, plural light-emitting diodes 13 can emit light at the desired luminance.

Also, when at least one of cathode voltages VKa-VKc is below lower limit reference voltage V91, voltage source circuit 33 increases anode voltage VA.

Consequently, voltage source circuit 33 can adjust anode voltage VA in a range in which a potential difference can be guaranteed between cathode voltages VKa-VKc detected with lower limit voltage detector 37 and voltages V72-V74 of the control terminals of current source circuit 34.

Consequently, it is possible to guarantee currents Ia-Ic flowing in light-emitting diodes 13, so that the luminance of light-emitting diodes 13 does not become insufficient.

Here, with the control, at least one of cathode voltages VKa-VKc can be controlled to an optimum voltage in the range of, e.g., 0.9-1.1 V.

Although the fall in voltage of light-emitting diode 13 is not constant due to variations in manufacture or temperature variation, the power loss in current source circuit 34 can be minimized.

Control value D35 is digitally refreshed in synchronization with clock signal S42E. Consequently, just as in the case of analog feedback control, anode voltage VA does not oscillate and vibration and instability do not occur.

Also, control is carried out such that the detection results of cathode voltages VKa, and VKc are fed back only in the period when light-emitting diodes 13 are on, and when they are off, anode voltage VA is maintained. Consequently, after the start of light ON, the necessary anode voltage VA is applied, so the light can be turned on/off quickly. Also, it is possible to turn on/off light-emitting diodes 13 quickly.

On the other hand, when anode voltage VA is controlled differently in that current Ia of light-emitting diodes 13 is monitored, a significant time is required for anode voltage VA to reach the necessary voltage. Consequently, in this control system, it is not possible to turn the light on/off quickly.

The display timing controller 42 supplies currents Ia-Ic from current source circuit 34 to light-emitting diode columns 14a-14c at the duty corresponding to data received by data interface part 41.

Also, in Embodiment 1, the display of light-emitting diode columns 14a-14c can be changed corresponding to the data.

Figure 7:
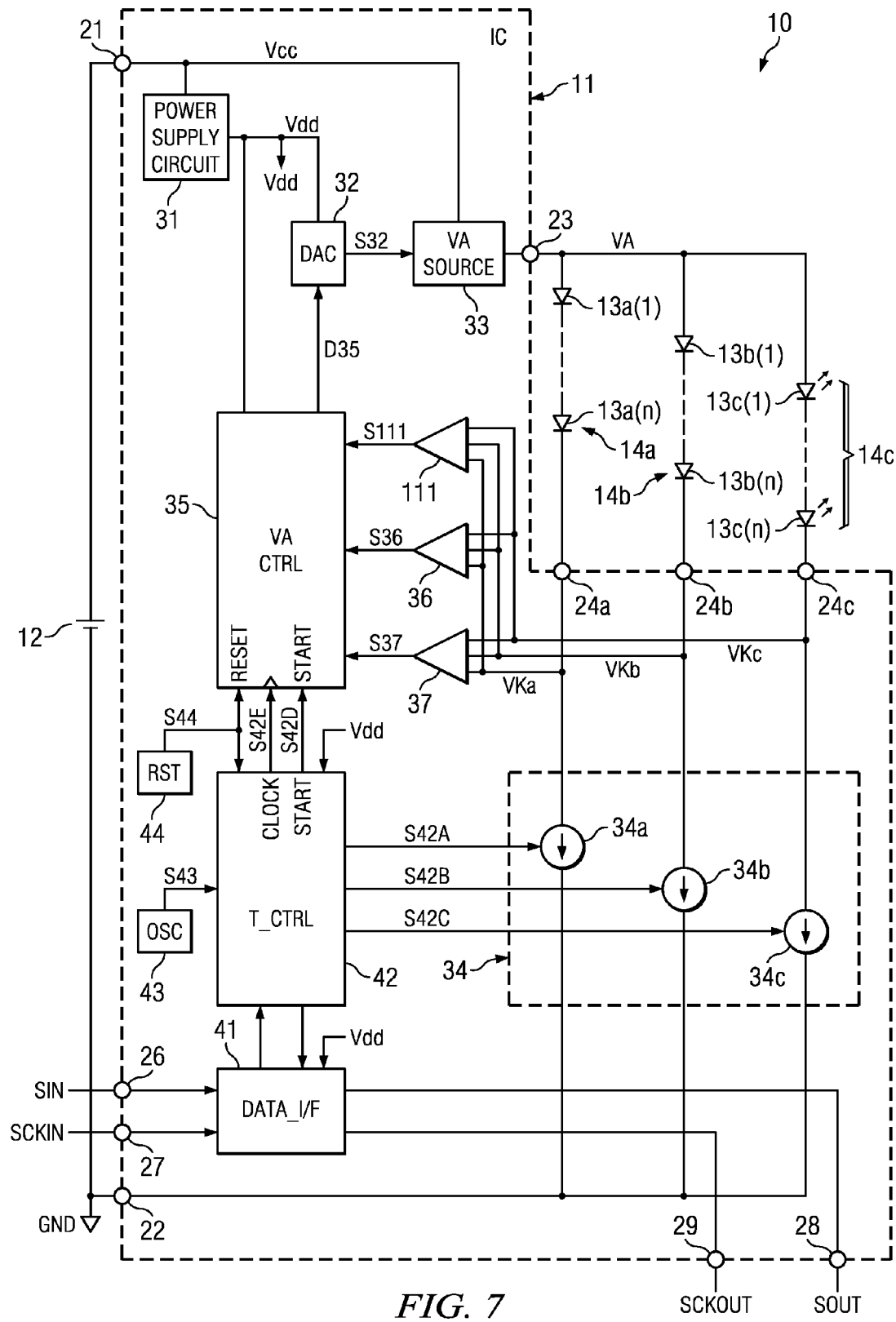
FIG. 7 is a time chart illustrating an example of the light-emitting diode controller in accordance with an embodiment of the invention.
Figure 8:
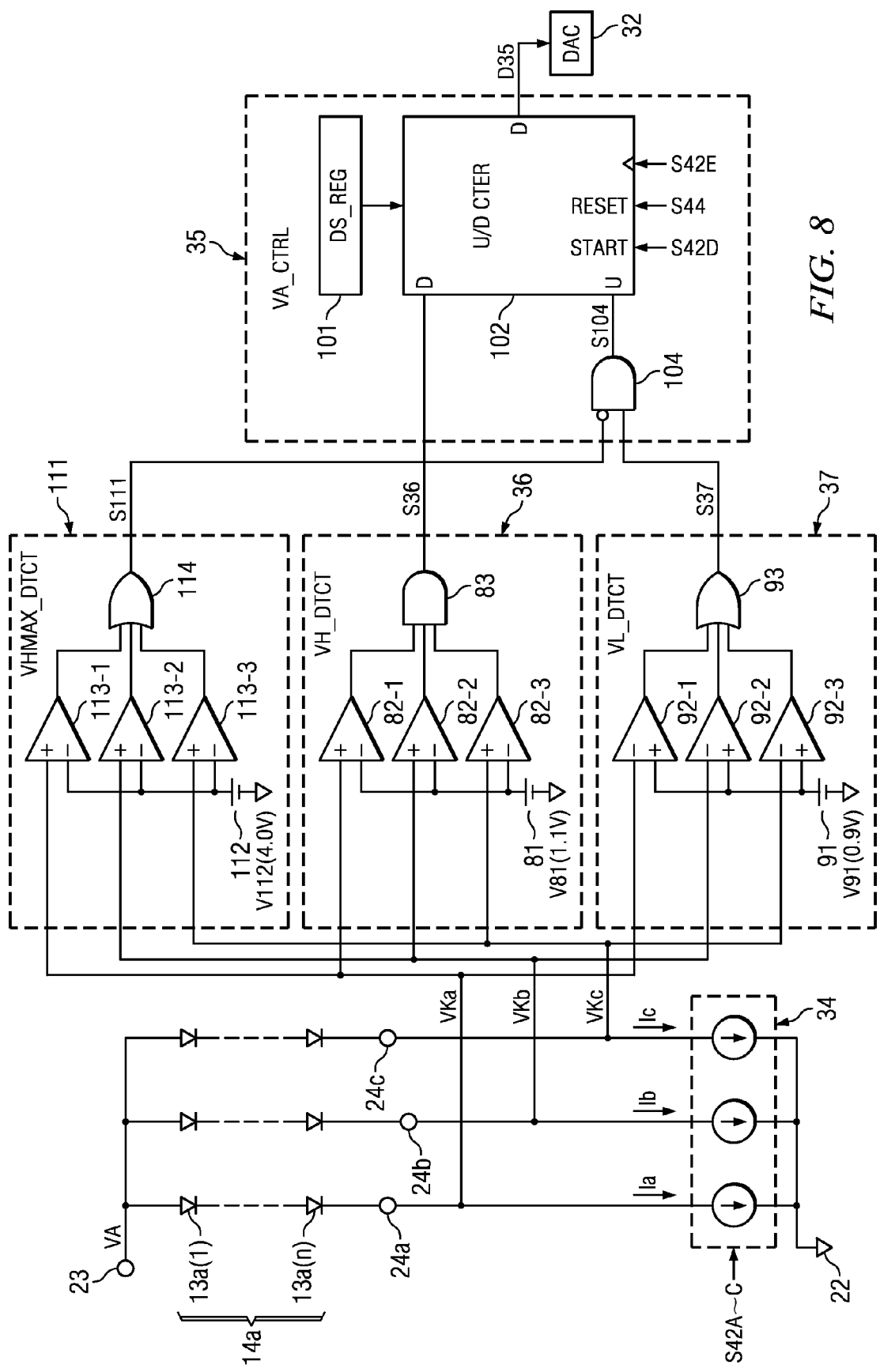
FIG. 8 is a circuit diagram illustrating an example of the circuit of the control value generating system in FIG. 7.

FIG. 7 is a schematic block diagram illustrating light-emitting diode controller 10 of the invention. The light-emitting diode controller 10 shown in FIG. 7 differs from light-emitting diode controller 10 shown in FIG. 1 in that it has abnormal voltage detector 111 added to it. FIG. 8 is a circuit diagram illustrating an example of the circuit of the control value generating system shown in FIG. 7.

Here, abnormal voltage detector (VHMAX_DTCT) 111 has voltage generator 112, three comparators 113-1, 113-2, 113-3 and OR circuit 114.

Voltage generator 112 of abnormal voltage detector 111 is only required to generate voltage V112 higher than adjustment reference voltage V81. The voltage generator 112, for example, is required to generate abnormal detected voltage V112 of about 4.0 V.

The difference in voltage between voltage fall Vf of high-luminance green light-emitting diode and voltage fall Vf of high-luminance blue light-emitting diode is, for example, about 1.5 V.

Consequently, in three light-emitting diode columns 14, when the specifications are such that every two of the red light-emitting diodes, blue light-emitting diodes, and green light-emitting diodes can be connected in series, the voltage fall difference between the three light-emitting diode columns 14 should tolerate at least a voltage difference of 3 V.

Also, for current source circuit 34, a voltage of, e.g., about 1.0 V is needed.

Consequently, for the specifications, abnormal detected voltage V112 must be over 4.0 V.

The voltage generator 112 is connected to inverted input terminals (−) of comparators 113-1 to 113-3 of abnormal voltage detector 111, and cathode terminals 24a-24c are connected to their non-inverted input terminals (+).

When the voltages at cathode terminals 24a-24c are higher than abnormal detected voltage V112, comparators 113-1 to 113-3 output high level signals, and, when the voltages are lower than the abnormal detected voltage, they output low level signals.

Comparators 113-1 to 113-3 of abnormal voltage detector 111 are connected to OR circuit 114.

When all output signals of the three comparators 113-1 to 113-3 are on the low level, output signal S114 of OR circuit 114 becomes low level. Otherwise, it becomes high level.

Consequently, when at least one of three cathode voltages VKa-VKc is higher than abnormal detected voltage V112 (e.g., 4.0 V), abnormal voltage detector 111 outputs high level signal S111.

Also, when all three cathode voltages VKa-VKc are lower than abnormal detected voltage V112 (e.g., 4.0 V), abnormal voltage detector 111 outputs low level signal S111.

As shown in FIG. 8, output voltage controller 35 has reference value register 101, up/down counter 102 as well as AND circuit 104.

One of the two input terminals of AND circuit 104 is an the inverted input terminal.

The abnormal voltage detector 111 is connected to the inverted input terminal of AND circuit 104. The lower limit voltage detector 37 is connected to the other input terminal. Also, AND circuit 104 is connected to up input U of up/down counter 102.

Consequently, when output signal S111 of abnormal voltage detector 111 is on the low level, AND circuit 104 of output voltage controller 35 supplies output signal S37 of lower limit voltage detector 37 to up input U of up/down counter 102. The up/down counter 102 counts up control value D35 in synchronization with clock signal S42E.

When the output signal of abnormal voltage detector 111 is on the high level, AND circuit 104 maintains input U of up/down counter 102 on the low level. For example, when lower limit voltage detector 37 detects that even one of three cathode voltages VKa-VKc is low, output signal S114 of AND circuit 104 is forcibly controlled to the low level.

As a result, up input U of up/down counter 102 is kept on the low level. Even if clock signal S42E is input, up/down counter 102 still does not count up control value D35. The control value D35 output from up/down counter 102 is not increased, and anode voltage VA and cathode voltages VKa-VKc also are not increased.

As explained above, when lower limit voltage detector 37 detects that any of cathode voltages VKa-VKc is low and abnormal voltage detector 111 detects an abnormality, control value D35 is not increased. Also, anode voltage VA and cathode voltages VKa-VKc do not increase. Consequently, it is possible to ensure that excessive increases in anode voltage VA and cathode voltages VKa-VKc do not occur.

For example, if a portion of three light-emitting diode columns 14a-14c connected to three cathode terminals 24a-24c drops out, or if problems of wire breakage or the like occur in a portion of light-emitting diode columns 14a-14c, lower limit voltage detector 37 detects it, and increases control value D35.

As a result of the detection, when control value D35 increases, anode voltage VA rises, and cathode voltages VKa-VKc of remaining light-emitting diode columns 14a, 14b, 14c in a normal light emission state also rise. Cathode voltages VKa-VKc become high.

If cathode voltages VKa-VKc of light-emitting diode column 14 in normal light emission are over, e.g., 4.0 V, abnormal voltage detector 111 detects an abnormality.

Then, control value D35 does not increase. Also, anode voltage VA and cathode voltages VKa—also do not further increase.

Figure 9:
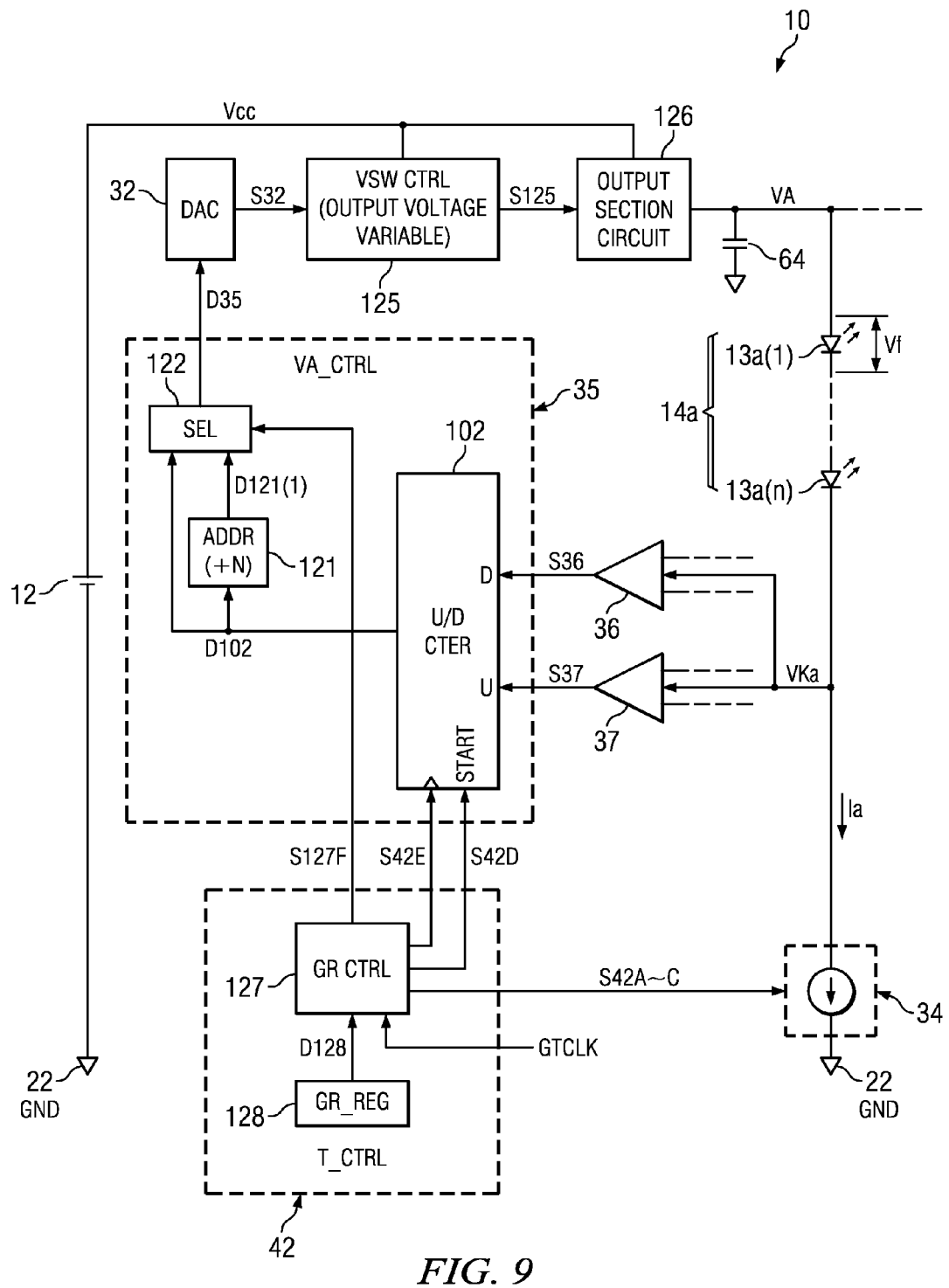
FIG. 9 is a schematic block diagram illustrating the main portion of the light-emitting diode controller in accordance with an embodiment of the invention.

FIG. 9 is a schematic block diagram illustrating the main portion of light-emitting diode controller 10 in Embodiment 3 of the invention. Here, light-emitting diode controller 10 shown in FIG. 9 differs from light-emitting diode controller 10 shown in FIG. 1 in that adder (ADDR) 121 and selector (SEL) 122 are added to output voltage controller 35.

The adder (ADDR) 121 adds a preset value (+N, e.g., +2) to control value D102 of up/down counter 102 to obtain addition value D121.

Selector (SEL) 123 selects one of control value D102 of up/down counter 102 and addition value D121 of adder 121, and supplies it to DA converter 32.

Consequently, the value selected by selector 123 becomes control value D35 of output voltage controller 35.

FIG. 9 is a schematic block diagram, which differs from the schematic block diagram of FIG. 1 in that the representation of light-emitting diode controller 10 is different.

As shown in FIG. 9, light-emitting diode controller 10 is shown in a simpler representation with the following parts not shown: various signal terminals 21-29, power supply circuit 31, light-emitting diode columns 14a-14c, data interface part 41, reset circuit 44, oscillator 43, current source circuit 34, etc.

Also, voltage source circuit 33, not shown in the figure, has switching type voltage controller (VSW_CTRL) 125, output section circuit 126, and capacitor 64.

The output section circuit 126 may consist of an FET (field effect transistor), coil, rectifying diode, etc.

In addition, display timing controller 42 has gradation controller (GR_CTRL) 127 and gradation data register (GR_REG) 128.

The gradation data register 128, for example, contains gradation data received by data interface part 41. The gradation data may have 36 bits.

Each time that gradation control timing clock signal GTCLK is input, gradation controller 127 has plural light-emitting diodes 13 emit light at a duty corresponding to the value of gradation data register 128.

Here, gradation control timing clock signal GTCLK is a signal for setting the start timing for each control period in FIG. 6. The gradation control timing clock signal GTCLK may be generated by a controller, not shown in the figure, and fed to gradation controller 127.

Figure 10:
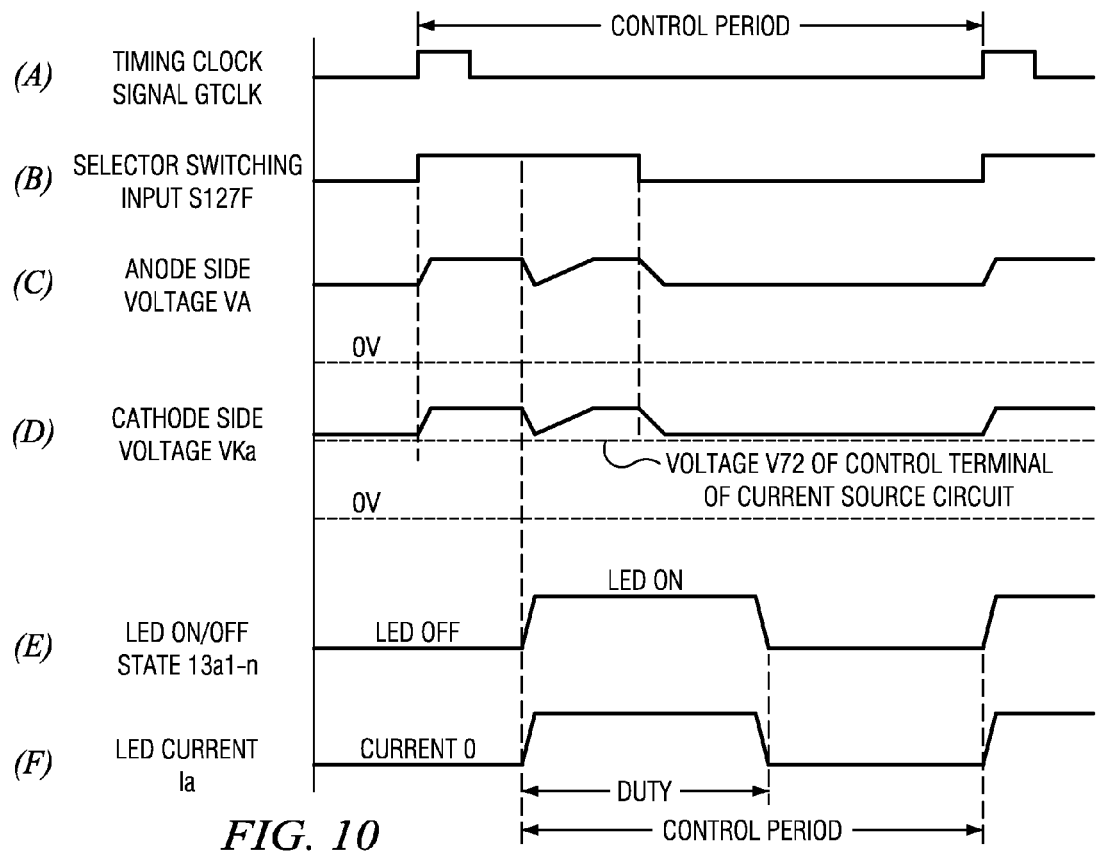
FIG. 10 is a time chart illustrating an example of the signal waveforms of the various portions in FIG. 9.

FIG. 10 is a time chart illustrating an example of signal waveforms at the various parts of FIG. 9.

FIG. 10A shows the waveform of gradation control timing clock signal GTCLK input to gradation controller 127; FIG. 10(B) shows the waveform of switching signal S127F input from gradation controller 127 to selector 122; FIG. 10C shows the waveform of anode voltage VA; FIG. 10D shows the waveform of cathode voltage VKa; FIG. 10(E) shows a waveform illustrating the ON/OFF control state of light-emitting diodes 13a1-13an; and FIG. 10F shows the waveform of current Ia of light-emitting diodes 13a1-13an.

For gradation controller 127, when gradation control timing clock signal GTCLK shown in FIG. 10A is input, as shown in FIG. 10B, switching signal S127F on the high level is output to selector 122.

Then, selector 122 selects addition value D121 of control value D102, and sends it to DA converter 32.

DA converter 32 generates analog voltage Vref corresponding to addition value D121.

Switching type voltage controller 125 executes a switching operation corresponding to the difference in potential between detected voltage V65 of anode voltage VA and analog voltage Vref.

The output section circuit 126 charges capacitor 64.

As a result, as shown in FIG. 10C, anode voltage VA rises from a voltage corresponding to control value D102 to a voltage corresponding to addition value D121. Also, as shown in FIG. 10D, cathode voltage VKa also rises together with anode voltage VA. The cathode voltage VKa and anode voltage VA are pre-boosted.

After output of switching signal S127F of high level to selector 122, gradation controller 127 controls current source circuit 34 to the ON state. For the gradation controller 127, for example, control is executed such that current source circuit 34 is turned on at a timing of 3-16 periods of gradation control timing clock signal GTCLK from the time of control of switching signal S127F to the high level.

As a result, as shown in FIG. 10E, the control state of light-emitting diodes 13 is switched from the OFF to the ON state.

At this time, corresponding to addition value D121, high anode voltage VA is applied on plural light-emitting diodes 13.

Consequently, as shown in FIG. 10F, from immediately after switching the control state of light-emitting diode 13 to the ON state, current Ia (Ib, Ic) pulled from current source circuit 34 flows into plural light-emitting diodes 13.

After current source circuit 34 is controlled to the ON state, gradation controller 127 returns switching signal S127F from high level to low level. For example, gradation controller 127 returns switching signal S127F from high level to low level at a timing of a few periods of gradation control timing clock signal GTCLK from the time when current source circuit 34 is controlled to the ON state.

As a result, selector 122 selects control value D102 instead of addition value D121, and sends it to DA converter 32.

DA converter 32 generates an analog voltage corresponding to control value D102.

The switching type voltage controller 125 executes a switching operation corresponding to the difference in potential between detected voltage V65 of anode voltage VA and analog voltage Vref.

The output section circuit 126 charges capacitor 64 up to a voltage corresponding to control value D102.

Also, the charge stored in capacitor 64 is consumed by light emission of light-emitting diodes 13.

As a result, as shown in FIG. 10C, anode voltage VA falls from the voltage corresponding to addition value D121 to the voltage corresponding to control value D102.

Also, as shown in FIG. 10D, cathode voltage VKa also falls along with anode voltage VA.

In the period of execution of the series of controls, as shown in FIG. 10E, after switching of the control state of light-emitting diode 13 from OFF to ON, as shown in FIGS. 10C and 10D, anode voltage VA and cathode voltage VKa instantly fall.

This occurs because the burst current of plural light-emitting diodes 13 is larger than the current for charging capacitor 64 by voltage source circuit 33 having switching type voltage controller 125 and output section circuit 126.

Also, it occurs because in switching type voltage controller 125 and output section circuit 126, control response delay, etc., exist and an instantaneous insufficiency in current cannot be supplemented.

However, before the control state of light-emitting diode 13 is switched from the OFF state to the ON state, as shown in FIG. 10D, cathode voltage VKa is boosted.

Consequently, although cathode voltage VKa temporarily falls, cathode voltages VKa, VKb, VKc do not fall below voltages V72, V73, V74 of the control terminals of current source circuit 34.

Consequently, as shown in FIG. 10F, immediately after switching of the control state of light-emitting diodes 13 from the OFF state to the ON state, currents Ia, Ib, Ic pulled from current source circuit 34 flow into light-emitting diodes 13.

In consideration of this problem, for example, for light-emitting diode controller 10 shown in FIG. 1, anode voltage VA is controlled so that the voltage difference between cathode voltages VKa, VKb, VKc and voltages V72, V73, V74 of the control terminals of current source circuit 34 becomes a necessary minimum.

Consequently, for light-emitting diode controller 10 shown in FIG. 1, immediately after switching of the control state of light-emitting diodes 13 from the OFF to the ON state, cathode voltages VKa, VKb, VKc may fall below the voltages at control terminals N72, N73, N74 of current source circuit 34.

In this case, currents Ia, Ib, Ic arranged in current source circuit 34 cannot flow in light-emitting diodes 13.

In the following, this will be explained in more detail.

Figure 11:
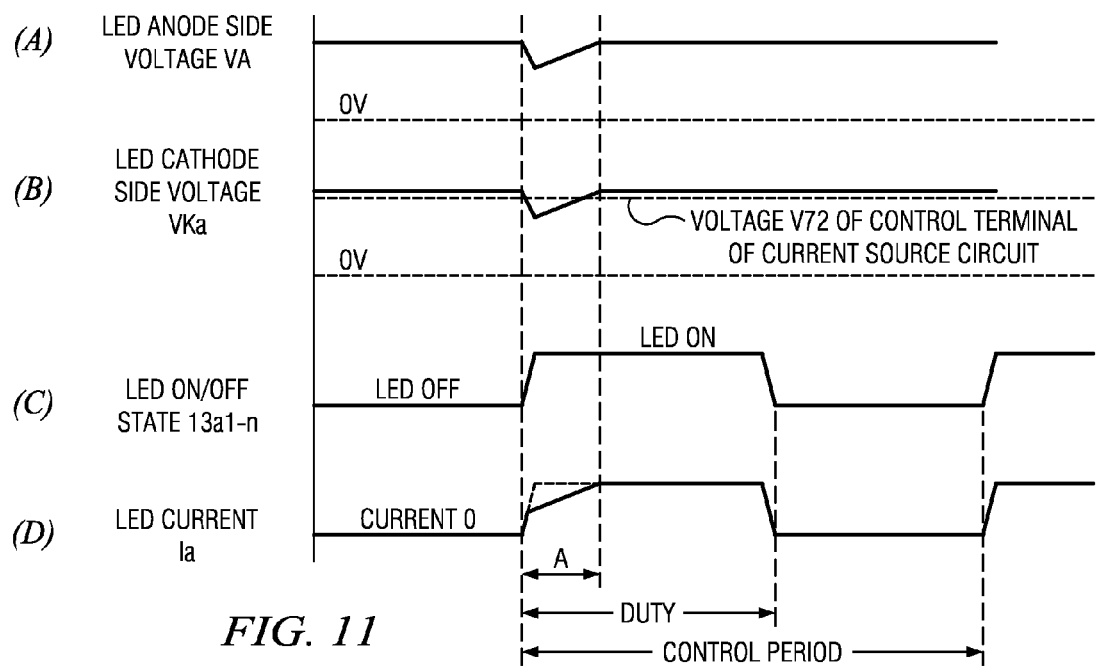
FIG. 11 is a time chart illustrating an example of the signal waveforms at the various portions corresponding to FIG. 10 in the light-emitting diode controller shown in FIG. 1.

FIG. 11 is a time chart illustrating an example of the signal waveforms at various parts in light-emitting diode controller 10 shown in FIG. 1 and corresponding to those in FIG. 10.

FIG. 11(A) shows the waveform of anode voltage VA based on control value D102; FIG. 11(B) shows the waveform of cathode voltage VKa; FIG. 11(C) shows a waveform illustrating the ON/OFF control state of light-emitting diodes 13a1-13an; and FIG. 11(D) shows the waveform of current Ia of light-emitting diodes 13.

As shown in FIGS. 11(A) and 11(B), in light-emitting diode controller 10 shown in FIG. 1, immediately after switching light-emitting diodes 13 to the ON state, anode voltage VA and cathode voltage VKa temporarily decrease.

Also, for light-emitting diode controller 10 shown in FIG. 1, cathode voltage VKa that temporarily falls may fall to a voltage lower than voltage V72 of a control terminal of current source circuit 34.

Consequently, as shown in FIG. 11(D), even if the control state of light-emitting diodes 13 is switched from the OFF to the ON state, set current Ia still does not flow in light-emitting diodes 13 during period A until cathode voltage VKa returns to a higher voltage than at control terminal N72 of current source circuit 34.

As a result, it is possible to decrease the quantity of light-emitted by light-emitting diodes 13 for each control period. Also, it is possible for light-emitting diodes 13 to emit light at the desired luminance.

As explained above, at the approximate time of control of light-emitting diodes 13 from the OFF to the ON state, control value D35 (an inclusive name for control value D102 and addition value D121, same in the following) sent to DA converter 32 is temporarily increased, and anode voltage VA is boosted.

Consequently, even if light-emitting diodes 13 are switched from the OFF to the ON state, cathode voltages VKa, VKb, VKc still do not fall below voltages V72, V73, V74 of the control terminals of current source circuit 34, and light-emitting diode 13 can emit light at the desired luminance.

Also, by temporarily increasing control value D35 sent to DA converter 32, it is possible to realize the effect that light-emitting diode 13 can emit light at the desired luminance.

Consequently, a steady increase in control value D35 supplied to DA converter 32 is not necessary. Control value D35 steadily supplied to DA converter 32 can assume a value corresponding to anode voltage VA that can efficiently decrease waste in power consumption.

In addition, even for the burst current, a variation in voltage is still very unlikely, and the capacitance of capacitor 64 does not have to be increased. Capacitor 64 with a small capacitance is used to cut the cost and to reduce the space requirement. Also, the capacitance of a capacitor not shown in the figure on the power supply side can be decreased. Also, inexpensive power supply 12 with a low response speed can be used.

Figure 12:
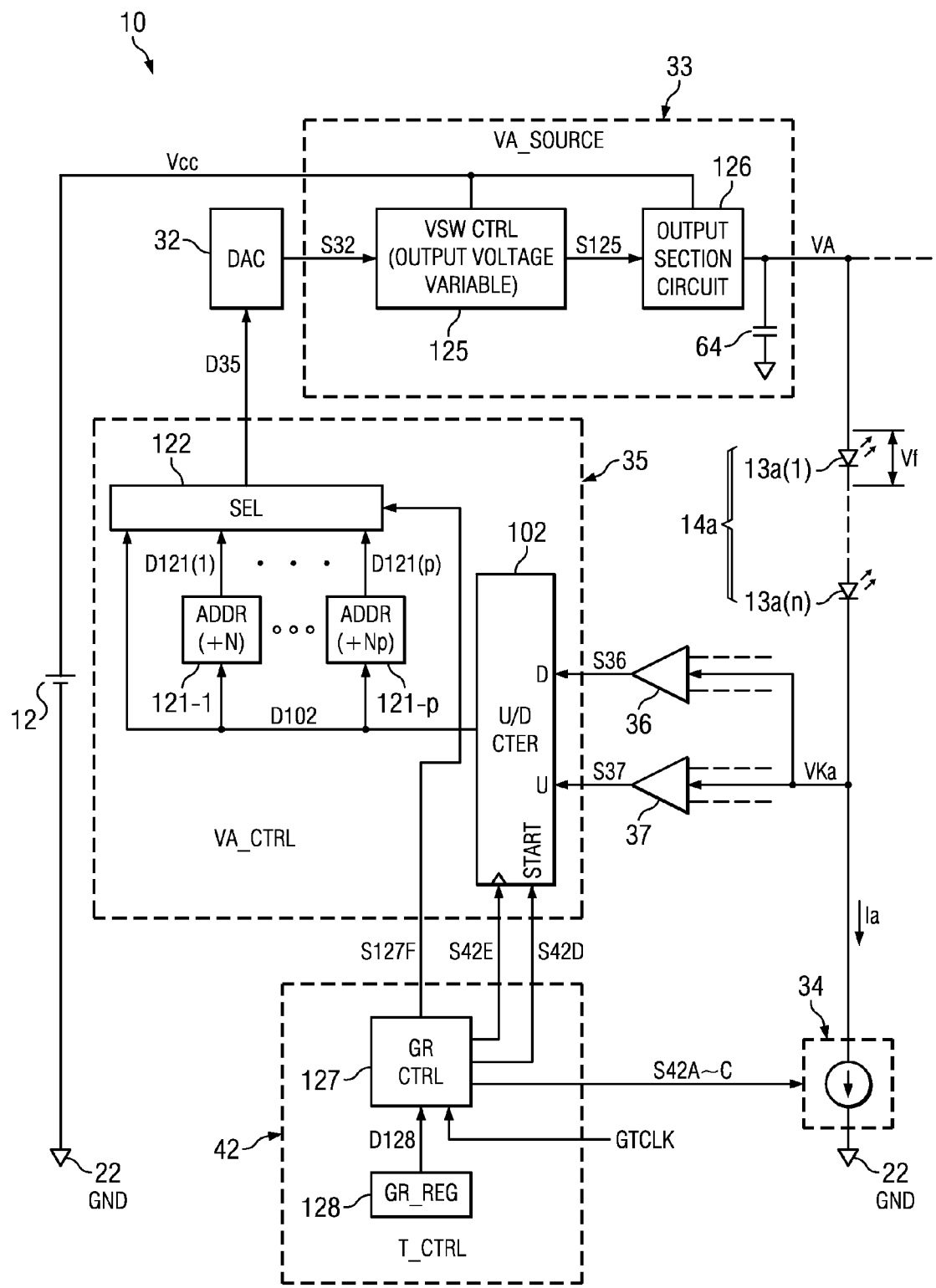
FIG. 12 is a schematic block diagram illustrating the main portion of the light-emitting diode controller in accordance with an embodiment of the invention.

FIG. 12 is a schematic block diagram illustrating the main portion of light-emitting diode controller 10. The light-emitting diode controller 10 shown in FIG. 12 differs from light-emitting diode controller 10 shown in FIG. 9 in that output voltage controller 35 has first to xth (x is a natural number) plural adders (ADDR) 121-1 to 121-*p* (p is a natural number) instead of one adder (ADDR).

The adders (ADDR) 121-1 to 121-*p* add preset values (+N, . . . , +Np) to control value D102 of up/down counter 102 to obtain addition values D121(1)-D121(*p*).

Here, the values set at adders 121-1 to 121-*p* may be different from each other, or some of them may be the same.

Then, corresponding to switching signal S127F from gradation controller 127, selector 122 selects one value from control value D102 of up/down counter 102 and the plural addition values D121(1)-D121(*p*) of adders 121-1 to 121-*p*, and outputs it as instruction value D35 to DA converter 32.

A shown, for example, gradation controller 127 can carry out the following control.

For example, for adders 121-1 to 121-*p*, the value is increased sequentially by one each time. In the time chart shown in FIG. 10, gradation controller 127 can output switching signal S127F to selector 122 so that it can consecutively switch the adders 121-1 to 121-*p*.

As a result, for example, instruction value D35 sent to DA converter 32 is increased or decreased in a stepwise manner.

Consequently, anode voltage VA is slowly increased/decreased. Also, anode voltage VA becomes a ramp waveform, and when anode voltage VA and cathode voltage VKa are changed, high-frequency components (or harmonic components) contained in them can be suppressed.

As a result, detection by adjustment voltage detector 36, lower limit voltage detector 37 or abnormal voltage detector 111 is very unlikely to be erroneous even if cathode voltages VKa, VKb, VKc contain high-frequency components (or harmonic components) and are distorted.

When instruction value D35 is changed in a stepwise manner over time, a smaller capacitor not shown in the figure can be used on the power supply side. The capacitor used on the power supply side can be inexpensive and have a low response speed.

In addition, for example, gradation controller 127 can carry out the following operation: for example, in the initial control period, it uses selector 122 to select adder 121-1 that adds +N to control value D102. As a result, cathode voltage VKa interrupts the voltage of control terminal N72 of current source circuit 34, and, when lower limit voltage detector 37 outputs high level detection signal S37, during the next control period, it uses selector 122 to select another adder (121-2) that adds +2N to control value D102.

Also, gradation controller 127 can switch the adder selected by selector 122 among adders 121-1 to 121-*p* until detection is not made by lower limit voltage detector 37.

As a result, even in a period in which ON of light-emitting diode 13 is started periodically, anode voltage VA reaches the lower limit without interruption of voltage V72 of the control terminal of current source circuit 34 by cathode voltage VKa. As a result, waste in power consumption can be suppressed.

Also, for example, corresponding to the mode, gradation controller 127 can appropriately use adders 121-1 to 121-*p*.

As explained above, adders 121-1 to 121-*p* add preset values to control value D102 generated by up/down counter 102, and selector 122 selects one from addition values D121(1)-D121(*p*), and sends it to DA converter 32.

In this way, selector 122 selects one of addition values D121(1)-D121(*p*), and, while anode voltage VA is in an increased condition, gradation controller 127 can start supplying current to light-emitting diodes 13 by means of current source circuit 34.

Consequently, even if anode voltage VA decreases due to a burst current at the start of light ON of light-emitting diodes 13, cathode voltages VKa-VKc do not fall below voltages V72-V74 of the control terminals of current source circuit 34.

As a result, currents Ia-Ic can flow in light-emitting diodes 13 to emit light from immediately after the start of supply of current to light-emitting diodes 13 by current source circuit 34.

Figure 13:
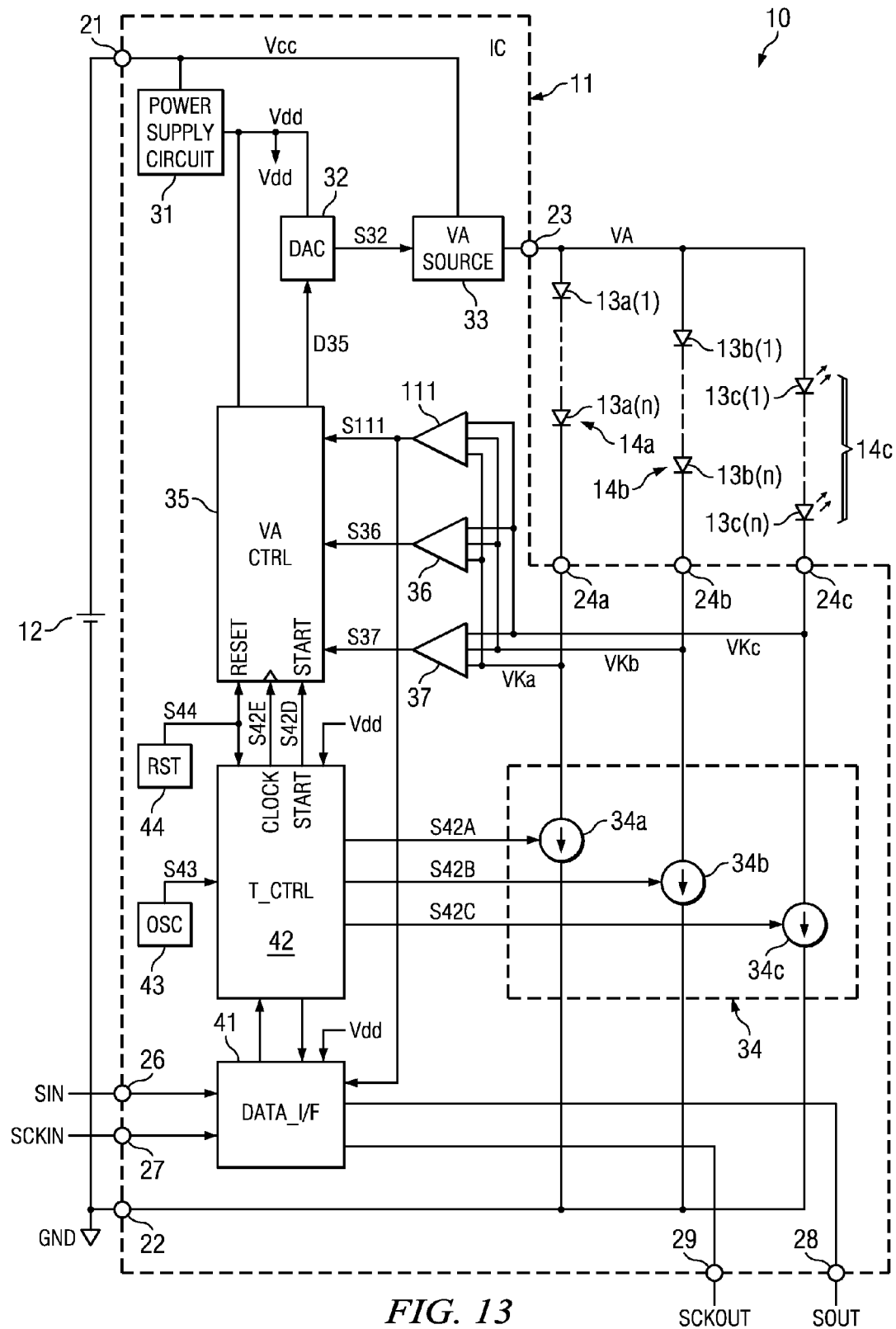
FIG. 13 is a schematic block diagram illustrating the main portion of the light-emitting diode controller in accordance with an embodiment of the invention.

FIG. 13 is a schematic block diagram illustrating the main portion of light-emitting diode controller 10. The light-emitting diode controller 10 shown in FIG. 13 differs from light-emitting diode controller 10 shown in FIG. 7 in that abnormal voltage detector 111 is connected to data interface part 41.

Figure 14:
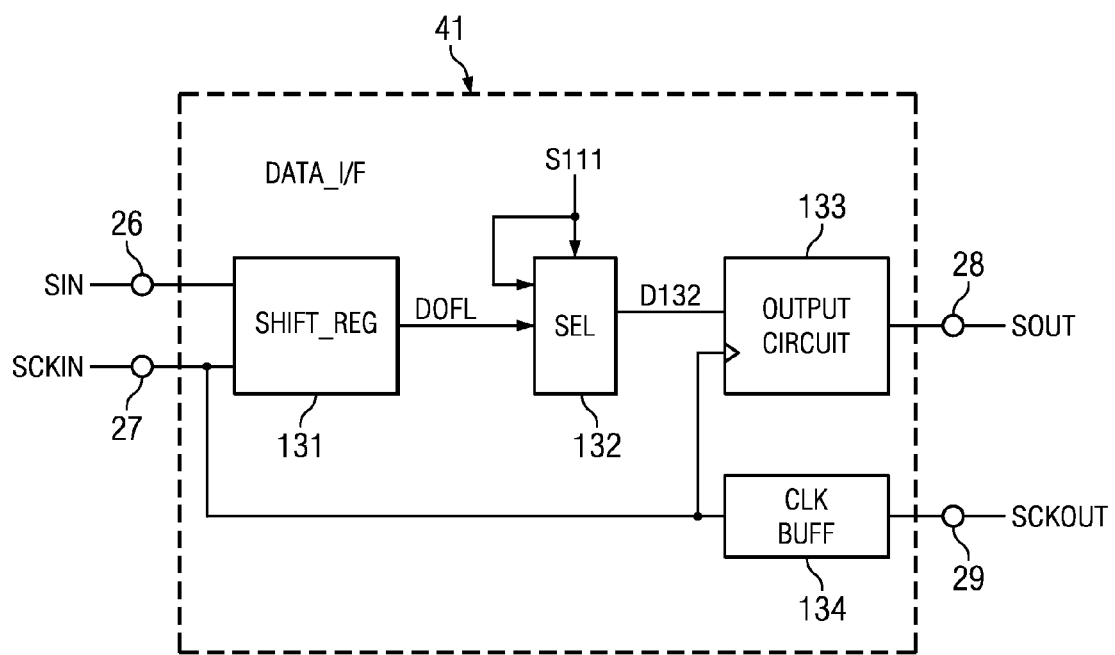
FIG. 14 is a schematic block diagram illustrating an example of the data interface circuit shown in FIG. 13.

FIG. 14 is a schematic block diagram illustrating an example of data interface part 41 in FIG. 13.

The data interface part 41 has n-bit shift register (SHIFT_REG) 131, selector (SEL) 132, output circuit 133, and clock buffer (CLK_BUFF) 134.

Shift data input terminal (SIN) 26 and shift clock input terminal (SCKIN) 27 are connected to shift register 131.

The shift register 131 and abnormal voltage detector 111 are connected to selector 132.

The selector 132 is connected to output circuit 133.

The output circuit 133 is connected to shift data output terminal (SOUT) 28.

The shift clock input terminal 27 is connected to clock buffer 134.

The clock buffer 134 is connected to shift clock output terminal (SCKOUT) 29.

The shift register 131 stores q-bit data. Here, q is a natural number, such as 40.

Also, shift register 131 outputs data DOFL of the most significant bit MSB of the stored q-bit data to selector 132.

Also, when a shift clock signal is input from shift clock input terminal 27, shift register 131 hatches the data input from shift data input terminal 26. For shift register 131 after the latch operation, data having plural bits stored before the latch operation are bit-shifted from a less significant bit to a more significant bit, and the latched data are stored as least significant bit LSB.

The selector 132 selects one of output data DOFL of shift register 131 and the voltage level of abnormal voltage detection signal S111 of abnormal voltage detector 111, and outputs it to output circuit 133.

More specifically, when abnormal voltage detection signal S111 is on the low level, selector 132 selects output data DOFL of shift register 131 and outputs it to output circuit 133.

Also, when abnormal voltage detection signal S111 is on the high level, selector 132 selects the voltage level of abnormal voltage detection signal S111, and outputs it to output circuit 133.

When a shift clock signal from shift clock input terminal 27 is input, output circuit 133 latches the output data of output circuit 133, and outputs them to shift data output terminal 28. The output data of output circuit 133 become shift data SOUT.

When any of cathode voltages VKa, VKb, VKc becomes 4.0 V or higher, abnormal voltage detector 111 controls abnormal voltage detection signal S111 to the high level. Otherwise, abnormal voltage detector 111 controls abnormal voltage detection signal S111 to the low level.

Consequently, in the normal state without detection of abnormality by abnormal voltage detector 111, abnormal voltage detection signal S111 becomes low level. In this case, output data DOFL of shift register 131 are sent to output circuit 133. When the shift clock signal is input, output circuit 133 latches output data DOFL and outputs them to shift data output terminal 28.

Consequently, upon input of the shift clock signal, the signal of overflow data not stored in shift register 131 is output from shift data output terminal 28.

Also, when abnormal voltage detector 111 detects an abnormality, abnormal voltage detection signal S111 becomes high level. In this case, the voltage level (high level) of abnormal voltage detection signal S111 is sent to output circuit 133. When the shift clock signal is input, output circuit 133 latches this voltage level (high level) and outputs it to shift data output terminal 28.

Consequently, a high level signal is output from shift data output terminal 28.

Figure 15:
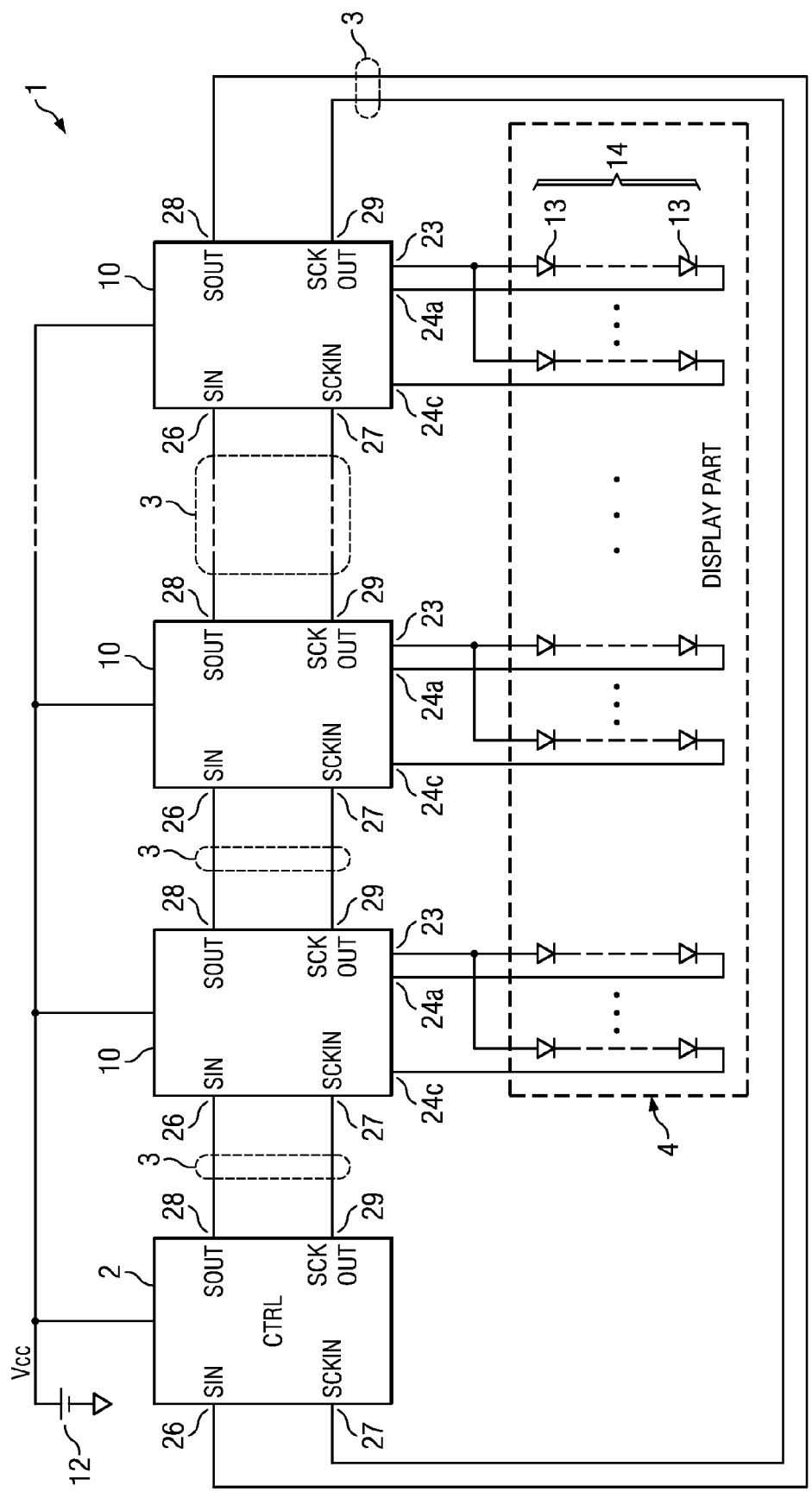
FIG. 15 is a diagram illustrating an example of a light-emitting system using a plurality of the light-emitting diode controllers shown in FIG. 13.

FIG. 15 is a diagram illustrating an example of light-emitting system 1 using a plurality of light-emitting diode controllers 10 shown in FIG. 13.

The light-emitting system 1 shown in FIG. 15 has plural light-emitting diode columns 14, r sets of light-emitting diode controllers 10, controller (CTRL) 2, and power supply 12. Display part 4 is formed from light-emitting diode columns 14. Here, r is a natural number.

Here, for example, display part 4 may be arranged on the outer wall of a building, in the hall of a building, etc. The display part 4 displays a full color image or the like by means of RGB (red-green-blue) for use as a message board or the like.

Plural light-emitting diode columns 14 are connected to light-emitting diode controllers 10.

Here, the constitution may differ from that shown in FIG. 15 in that plural light-emitting diode controllers 10 may be connected to one light-emitting diode column 14.

As a result, currents from plural light-emitting diode controllers 10 are fed to one light-emitting diode column 14, and a large current flow is possible.

In addition, the anodes of light-emitting diode column 14 of another light-emitting diode controller 10 may be connected to anode terminal 23 of one light-emitting diode controller 10.

Controller 2 and r sets of light-emitting diode controllers 10 are connected in series by means of signal cable 3.

More specifically, by means of signal cable 3, shift data output terminal (SOUT) 28 and shift clock output terminal (SCKOUT) 29 of controller 2 are connected to shift data input terminal (SIN) 26 and shift clock input terminal (SCKIN) 27 of the first light-emitting diode controller 10.

The shift data output terminal (SOUT) 28 and shift clock output terminal (SCKOUT) 29 of the first light-emitting diode controller 10 are connected by signal cable 3 to shift data input terminal (SIN) 26 and shift clock input terminal (SCKIN) 27 of the second light-emitting diode controller 10.

Also, shift data output terminal (SOUT) 28 and shift clock output terminal (SCKOUT) 29 of the last light-emitting diode controller set 10 among the r sets of light-emitting diode controllers are connected by signal cable 3 to shift data input terminal (SIN) 26 and shift clock input terminal (SCKIN) 27 of controller 2.

With the connection, shift data output in series from shift data output terminal (SOUT) 28 by controller 2 are sequentially shifted between r sets of light-emitting diode controllers 10 in synchronization with shift clock signal SCK output from controller 2.

More specifically, shift data output serially from controller 2 are shifted to shift register 131 of the second light-emitting diode controller 10, then to shift register 131 of the first light-emitting diode controller 10, . . . , and finally to shift register 131 of the rth light-emitting diode controller set 10, followed by returning to controller 2.

Here, when shift register 131 of light-emitting diode controller 10 has q bits, after qxr clock pulses, shift data output serially from controller 2 are returned to controller 2.

For example, for the second light-emitting diode controller 10, if one light-emitting diode column 14 drops out or wire breakage takes place in one light-emitting diode column 14, the detection signal of abnormal voltage detector 111 becomes high level. Output signal SOUT of the second light-emitting diode controller 10 is maintained on the high level.

Consequently, among the data of qxr bits returned to controller 2, the value after the initial q bits is changed to the high level value (e.g., 1).

Consequently, by comparing the data of qxr bits transferred by itself and the data of qxr bits received, controller 2 can easily detect generation of an abnormality in the second light-emitting diode controller set 10 among the r sets of light-emitting diode controllers connected in series.

As a result, controller 2 can execute control of a display or another treatment for an abnormality corresponding to a detected abnormality.

In addition, as shown in FIG. 15, among the r sets of light-emitting diode controllers 10 connected in series, shift clock input terminals (SCKIN) 27 of the second light-emitting diode controller 10 and thereafter are connected to shift clock output terminal (SCKOUT) 29 of light-emitting diode controller 10 of the preceding section.

Figure 16:
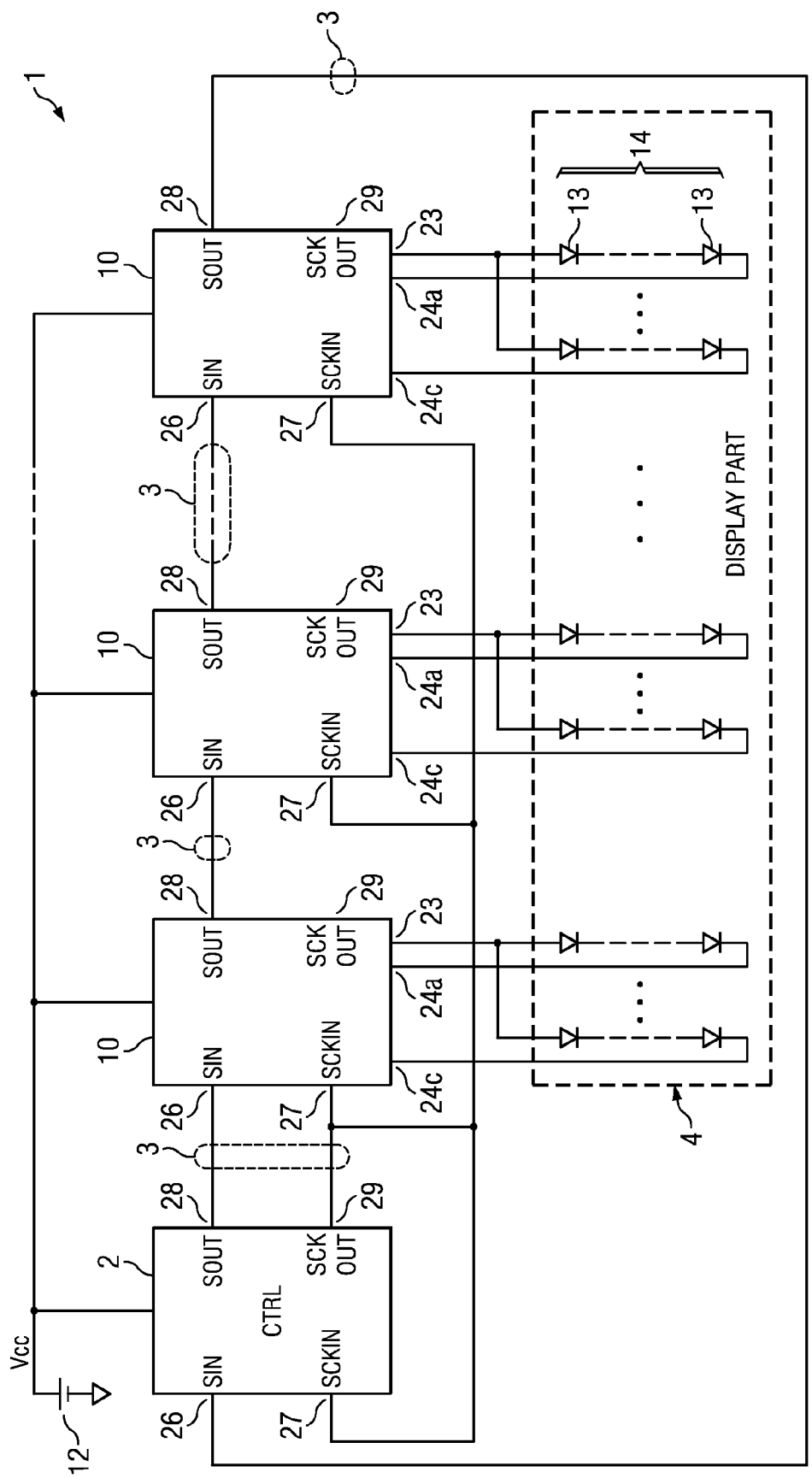
FIG. 16 is a diagram illustrating a modified example of the light-emitting system shown in FIG. 15.

In addition, as shown in FIG. 16, shift clock output terminal (SCKOUT) 29 of r sets of light-emitting diode controllers 10 may be connected to shift clock output terminal (SCKOUT) 29 of controller 2.

In addition, for example, the following scheme may be adopted: the r sets of light-emitting diode controllers 10 may be grouped, with each group having plural sets, and shift clock input terminal 27 of the first light-emitting diode controller 10 of each group is connected to shift clock output terminal 29 of controller 2 as shown in FIG. 16, and shift clock input terminals 27 of the second light-emitting diode controller 10 and thereafter in the group are connected to shift clock output terminal 29 of light-emitting diode controller 10 of the preceding section in the group.

As explained above, each light-emitting diode controller 10 controls the light emission of light-emitting diodes 13 using light emission control data received from controller 2.

Also, for each light-emitting diode controller 10, if abnormal voltage detector 111 detects an abnormality (dropout or wire breakage of light-emitting diode column 14), the data indicating this state are transmitted from data interface part 41 to other light-emitting diode controllers 10 and controller 2.

Consequently, each light-emitting diode controller 10 and controller 2 can detect the generation of an abnormality based on abnormality information notified from other light-emitting diode controllers 10 and can execute any sequence for treatment of the abnormality.

As shown in FIG. 13, abnormal voltage detector 111 is directly connected to data interface part 41. However, as shown in FIG. 17, one may also adopt a scheme in which output voltage controller 35 is connected to data interface part 41.

Figure 17:
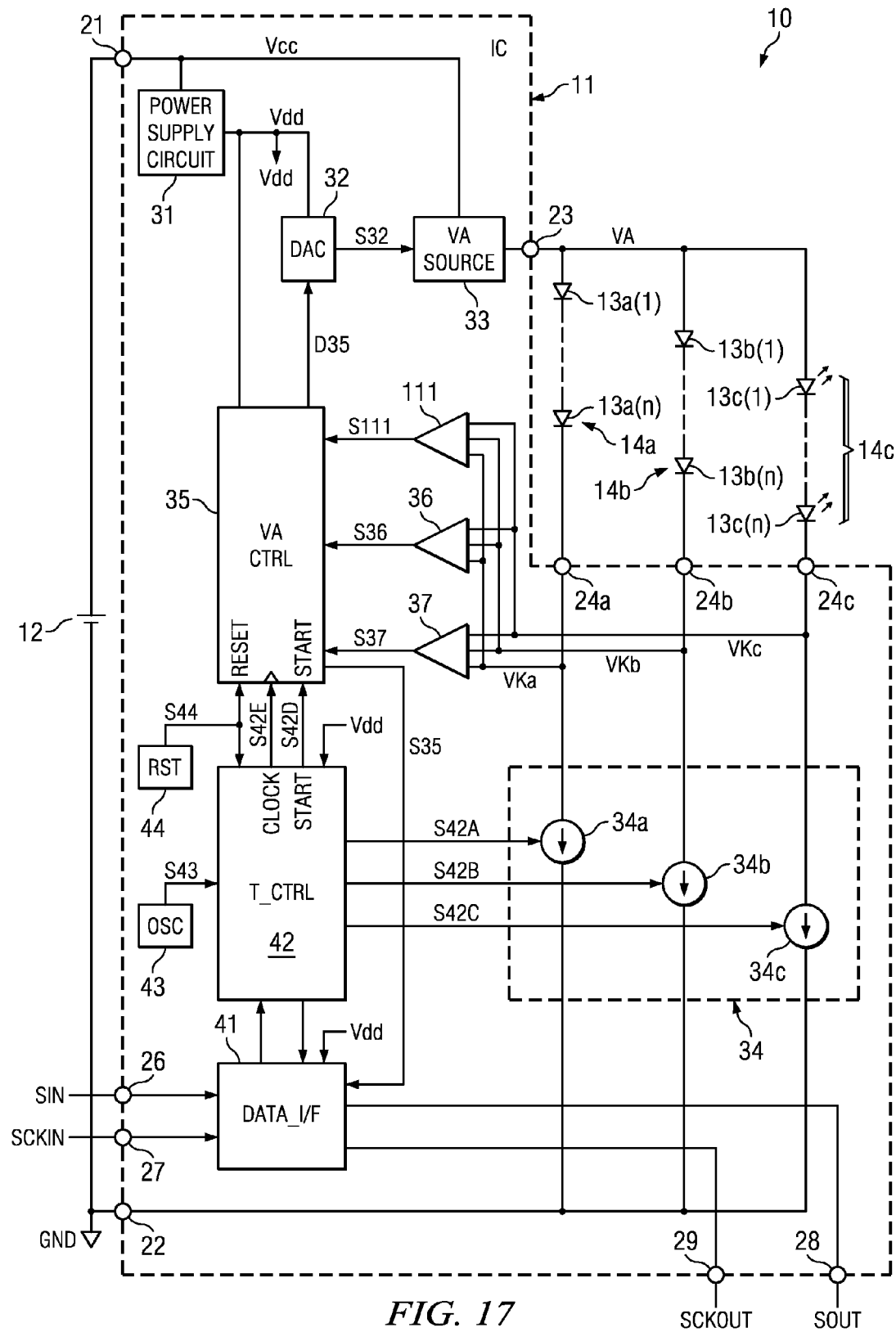
FIG. 17 is a schematic block diagram illustrating the main portion of a modified example of the light-emitting diode controller shown in FIG. 13.

In the case of connection as shown in FIG. 17, output voltage controller 35, for example, buffers the output of abnormal voltage detector 111, and the buffered signal is output as signal S35 to selector 132 of data interface part 41.

As a result, when abnormal voltage detector 111 detects an abnormality, such as dropout or wire breakage of light-emitting diode column 14, data interface part 41 can transmit signal SOUT indicating the abnormality to another light-emitting diode controller 10 and controller 2.

With the connection shown in FIG. 17, as another scheme that may be adopted, when control value D102 of up/down counter 102 becomes the maximum value or when control value D102 reaches a preset upper limit, output voltage controller 35 outputs abnormality detection signal S35 to selector 132 of data interface part 41.

When control value D102 of up/down counter 102 becomes the maximum value, or when control value D102 reaches the preset upper limit value, output voltage controller 35 generates abnormality detection signal S35 and outputs it to selector 132 of data interface part 41, so that even if an abnormality takes place in all light-emitting diode columns 14, data interface part 41 still can transmit signal SOUT indicating the abnormality to other light-emitting diode controllers 10 and controller 2.

That is, output voltage controller 35 can detect an abnormality and data interface part 41 can notify the abnormality to other light-emitting diode controllers 10 and controller 2 not only when an abnormality takes place in a portion of light-emitting diode columns 14, such as dropout or wire breakage of a light-emitting diode column 14, but also when an abnormality takes place in all light-emitting diode columns 14.

Figure 18:
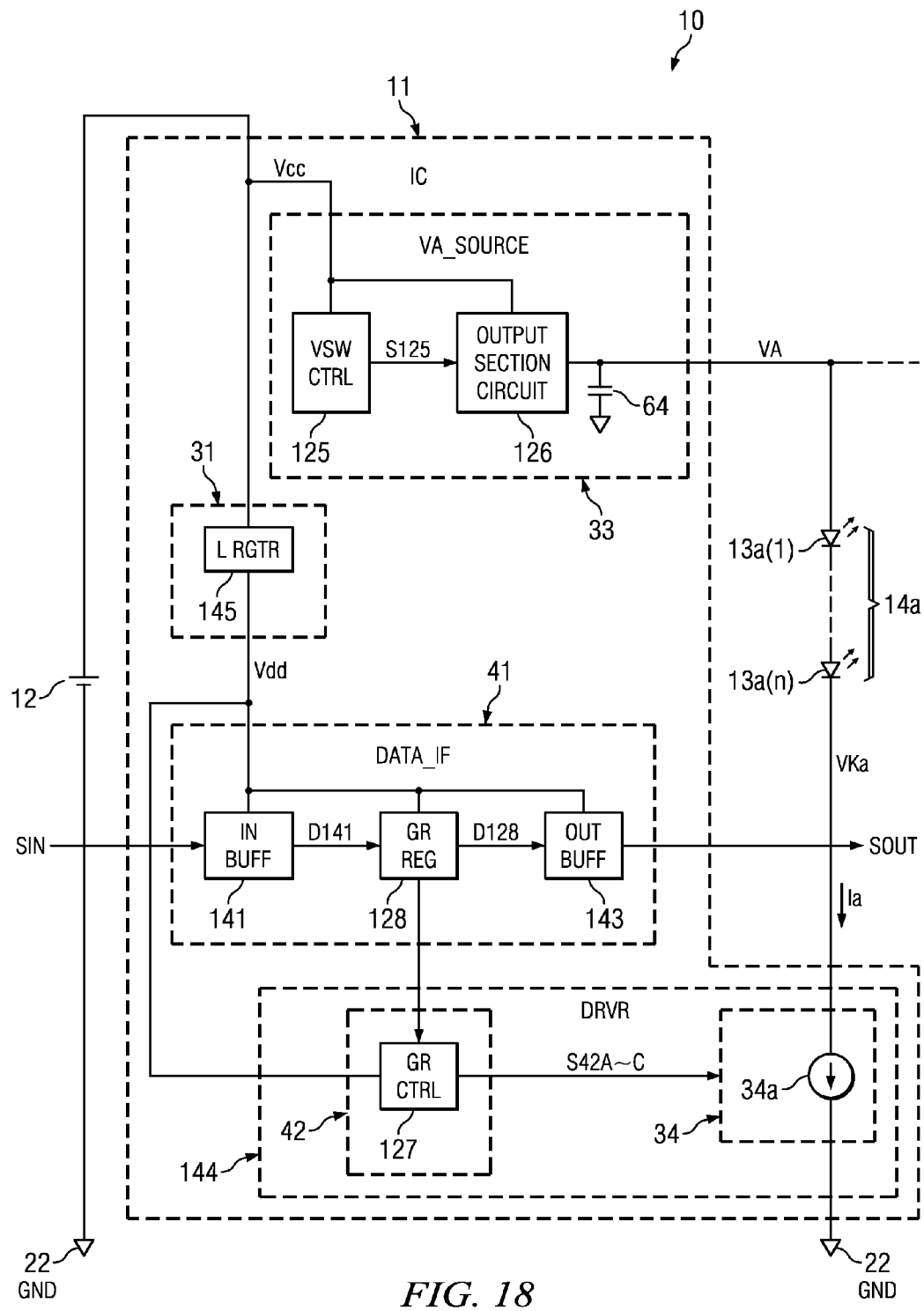
FIG. 18 is a schematic block diagram illustrating the light-emitting diode controller shown in FIG. 1, rearranged around the power supply system.

FIG. 18 is a schematic block diagram illustrating light-emitting diode controller 10 in FIG. 1 shown here with the power supply system as the center. In the schematic block diagram in FIG. 18, light-emitting diode controller 10 shown in FIG. 1 is depicted with the following parts not shown in the figure: various signal terminals 21-29 of integrated circuit 11, a number of light-emitting diode columns 14, DA converter 32, output voltage controller 35, adjustment voltage detector 36, lower limit voltage detector 37, reset circuit 44, and oscillator 43.

Here, voltage source circuit 33 of light-emitting diode controller 10 has voltage controller (VSW_CTRL) 125, output section circuit 126 and capacitor 64.

The data interface part 41 has input buffer (IN_BUFF) 141, gradation data register (GR_REG) 128, and output buffer (OUT_BUFF) 143.

The display timing controller 42 has gradation controller (GR_CTRL) 127.

Also, power supply circuit 31 of light-emitting diode controller 10 has linear regulator (LRGTR) 145.

Regulator voltage Vreg generated by linear regulator 145 is supplied as internal power supply voltage Vdd to data interface part 41, LED driver 144 (display timing controller 42 and current source circuit 34), DA converter 32, output voltage controller 35, adjustment voltage detector 36, lower limit voltage detector 37, reset circuit 44, and oscillator 43.

Consequently, the internal circuit, except for voltage source circuit 33 in integrated circuit 11 of light-emitting diode controller 10, functions as regulator voltage Vreg.

In the light-emitting diode controller 10 shown in FIG. 18, voltage source circuit 33, data interface part 41 and LED driver 144 are integrated into a single integrated circuit 11.

Consequently, the power consumption of the internal circuit, except for voltage source circuit 33 in integrated circuit 11, becomes equation 4, as follows.

In equation 4, P represents the power consumption, Vcc represents the power supply voltage fed to integrated circuit 11, and I(sum) represents the sum of the currents consumed in the internal circuit, except for voltage source circuit 33 in integrated circuit 11.

$$P = Vcc \times I(\text{sum}) \qquad \text{Equation 4}$$

As can be seen from equation 4, the power consumption of the internal circuit, except for voltage source circuit 33 in integrated circuit 11, increases as power source voltage Vcc increases.

Here, when the internal circuit, except for voltage source circuit 33 in integrated circuit 11, can function at a voltage of, e.g., 5 V, the electric power consumed due to the supply of a voltage higher than the voltage is wasted.

Also, the wasted power is consumed inside integrated circuit 11, so the package of integrated circuit 11 is heated.

As a result, a protective circuit not shown in the figure in integrated circuit 11 must frequently function.

Also, in light-emitting diode controller 10, the protective circuit of integrated circuit 11 is arranged along with a temperature sensor in output section circuit 126 of voltage source circuit 33 or the like.

In this case, when the package of integrated circuit 11 is heated, the protective circuit functions, and the current flowing in light-emitting diode 13 is limited.

Here, in light-emitting diode controller 10, the power supplied to the internal circuit, except for voltage source circuit 33 in integrated circuit 11, is generated from anode voltage VA. As a result, power consumption can be suppressed.

Figure 19:
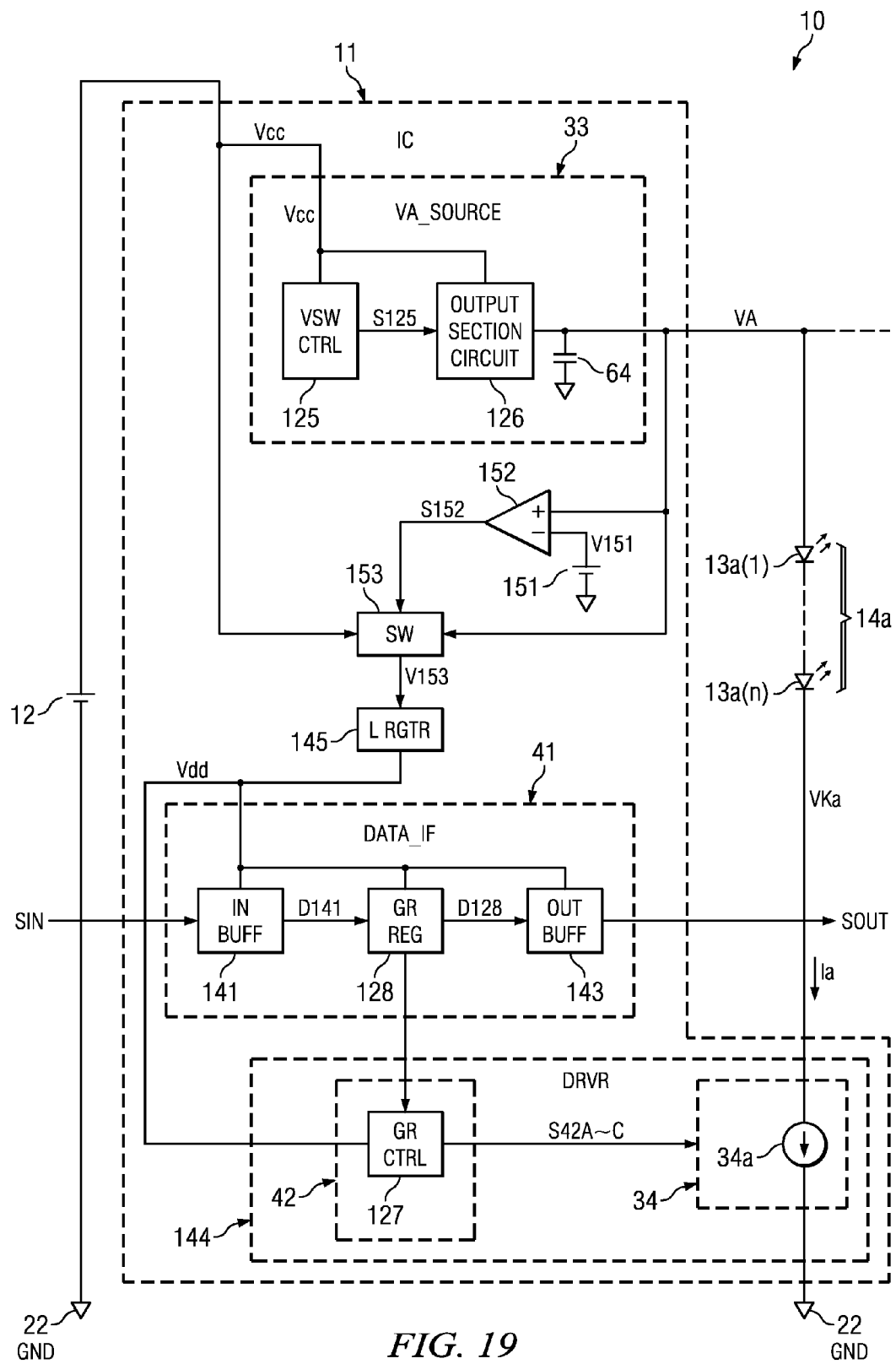
FIG. 19 is a schematic block diagram illustrating the main portion of the light-emitting diode controller in accordance with an embodiment in the invention.

FIG. 19 is a schematic block diagram illustrating the main portion of light-emitting diode controller 10.

The light-emitting diode controller 10 shown in FIG. 19 differs from light-emitting diode controller 10 shown in FIG. 18 in that it also has switching reference voltage generator 151, switching converter 152, and switch (SW) 153.

The switching reference voltage generator 151 is connected to an inverted input terminal of switching converter 152.

The voltage source circuit 33 is connected to a non-inverted input terminal of switching converter 152.

The switch 153 is connected to switching converter 152.

The voltage source circuit 33, power supply terminal 21 and linear regulator 145 are connected to the switch 153.

The switching reference voltage generator 151 generates switching reference voltage V151.

The switching reference voltage V151 is a reference voltage for judging switching of the voltage fed to linear regulator 145 between anode voltage VA of voltage source circuit 33 and power source voltage Vcc of power supply terminal 21.

Consequently, switching reference voltage V151 should be higher than the voltage needed for the operation of the internal circuit, except for voltage source circuit 33 in integrated circuit 11. For example, switching reference voltage V151 may be identical to internal power supply voltage Vdd generated by linear regulator 145 (e.g., 7 V).

The switching converter 152 compares anode voltage VA to switching reference voltage V151, and outputs switch signal S152 to switch 153.

More specifically, when anode voltage VA is lower than switching reference voltage V151, switch signal S152 becomes low level. Also, when anode voltage VA is higher than switching reference voltage V151, switch signal S152 becomes high level.

Corresponding to switch signal S152, the switch 153 selects one of voltage source circuit 33 and power supply terminal 21 to connect to linear regulator 145.

More specifically, when switch signal S152 is on the low level, switch 153 selects power supply 12 and connects it to linear regulator 145.

In this case, power source voltage Vcc is fed to linear regulator 145. Here, regulator voltage Vreg generated from power source voltage Vcc is supplied to the internal circuit, except for voltage source circuit 33 in integrated circuit 11.

On the other hand, when switch signal S152 is on the high level, switch 153 selects voltage source circuit 33 and connects it to linear regulator 145.

In this case, anode voltage VA is fed to linear regulator 145. Here, regulator voltage Vreg generated from anode voltage VA is fed to the internal circuit except for voltage source circuit 33 in integrated circuit 11.

In the following, the operation of light-emitting diode controller 10 will be explained.

When power supply 12 is connected to integrated circuit 11 shown in FIG. 19, the internal circuit of integrated circuit 11 starts functioning. For example, voltage source circuit 33 generates anode voltage VA from power source voltage Vcc.

Here, because voltage source circuit 33 charges capacitor 64 due to the switching operation, anode voltage VA becomes the desired voltage after a short time, instead of becoming the desired voltage immediately after power supply 12 is turned on.

Consequently, immediately after power supply 12 is turned on, anode voltage VA falls below switching reference voltage V151 generated by switching reference voltage generator 151.

Here, switching converter 152 outputs low level switch signal S152. Switch 153 selects power supply terminal 21.

As a result, power source voltage Vcc is fed to linear regulator 145. Here, regulator voltage Vreg generated from power source voltage Vcc is fed to the internal circuit except for voltage source circuit 33 in integrated circuit 11.

In this case, the power consumption of the internal circuit, except for voltage source circuit 33 in integrated circuit 11, becomes the power computed with the equation 4.

After the passage of a certain amount of time after power on, capacitor 64 is charged, and anode voltage VA rises. The anode voltage VA exceeds switching reference voltage V151.

As a result, switch signal S152 of switching converter 152 is switched from the low level to the high level. The switch 153 selects voltage source circuit 33.

Consequently, regulator voltage Vreg generated from anode voltage VA of voltage source circuit 33 is fed to the internal circuit, except for voltage source circuit 33 in integrated circuit 11.

In this case, the power consumption of the internal circuit, except for voltage source circuit 33 in integrated circuit 11, is computed by replacing Vcc in the equation 4 with anode voltage VA.

Here, anode voltage VA is the voltage generated by voltage source circuit 33 based on power source voltage Vcc, and it is lower than power source voltage Vcc.

As a result, the power consumption of the internal circuit, except for voltage source circuit 33 in integrated circuit 11, can be suppressed. The waste in power consumption and the overall power consumption of integrated circuit 11 can be cut. Also, by cutting the power consumption, the rise in temperature of the package of integrated circuit 11 can be suppressed, so that a protective circuit (not shown in the figure) will not have to frequently function.

Switch 153 switches the voltage fed to one linear regulator 145 between power source voltage Vcc and anode voltage VA.

In addition, one may also adopt a scheme in which switch 153 switches the regulator voltage fed to the internal circuit, except for voltage source circuit 33 in integrated circuit 11.

Figure 20:
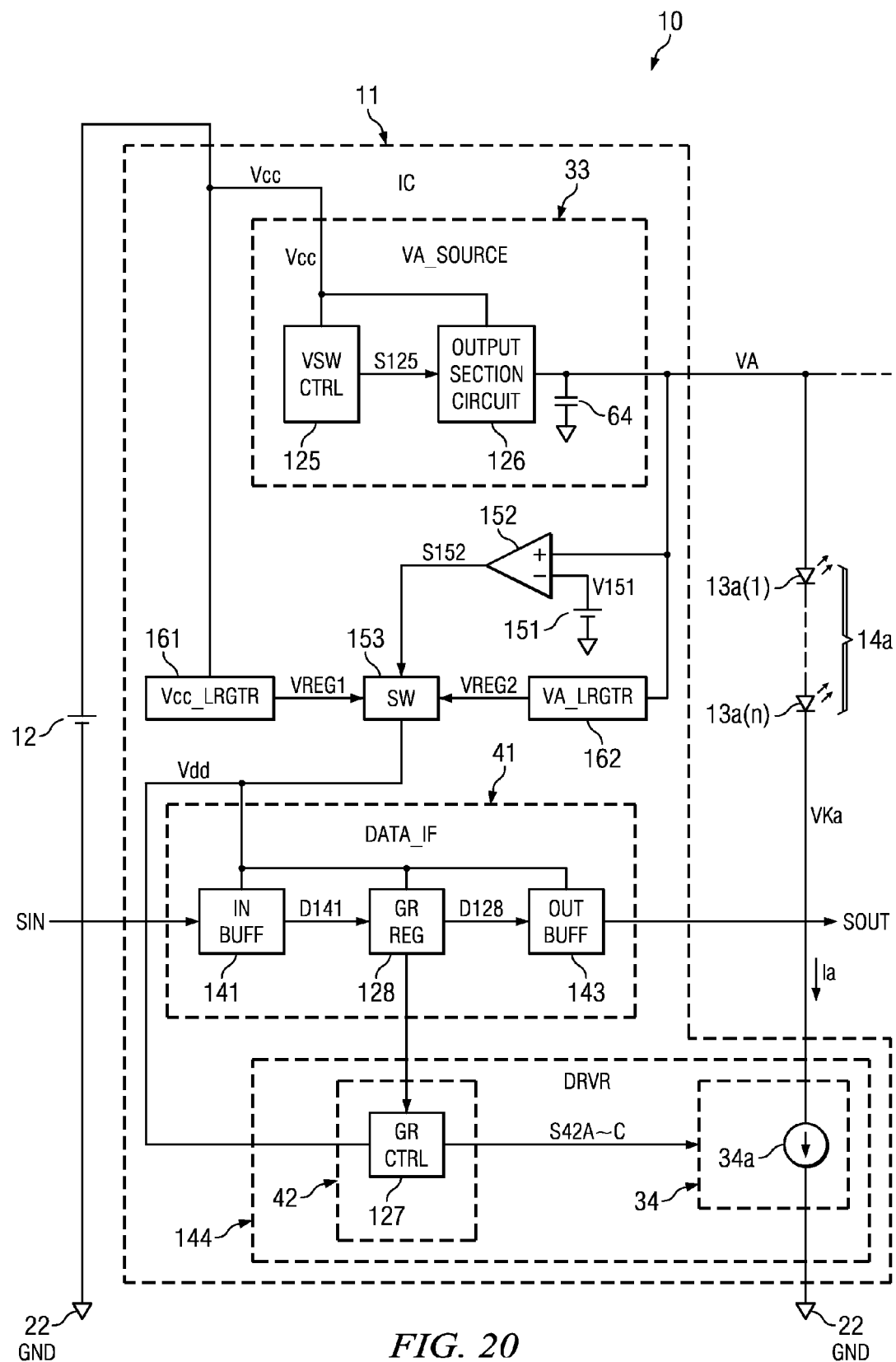
FIG. 20 is a schematic block diagram illustrating the main portion of the light-emitting diode controller in accordance with an embodiment of the invention.

FIG. 20 is a schematic block diagram illustrating the main portion of light-emitting diode controller 10 in a modified example.

The light-emitting diode controller 10 in the modified example differs from light-emitting diode controller 10 shown in FIG. 19 in that, instead of linear regulator 145, it has starting linear regulator (Vcc_LRGTR) 161 and normal linear regulator (VA_LRGTR) 162.

Here, starting linear regulator 161 is connected to power supply terminal 21. The starting linear regulator 161 generates starting power supply voltage Vreg1 based on power source voltage Vcc.

The normal linear regulator 162 is connected to voltage source circuit 33. The normal linear regulator 162 generates normal power supply voltage Vreg2 based on anode voltage VA.

Also, starting linear regulator 161 and normal linear regulator 162 can generate regulator voltages at the same voltage level or different voltage levels.

The switch 153 is connected to starting linear regulator 161, normal linear regulator 162 and the internal circuit, except for voltage source circuit 33 in integrated circuit 11. The switch 153 selects one of starting power supply voltage Vreg1 and normal power supply voltage Vreg2, and supplies to the internal circuit, except for voltage source circuit 33 in integrated circuit 11.

In light-emitting diode controller 10 shown in FIG. 20, switch 153 selects starting power supply voltage Vreg1 in the start mode, and sends it to the internal circuit, except for voltage source circuit 33 in integrated circuit 11.

Also, when a prescribed time has passed from the start, switch 153 selects normal power supply voltage Vreg2, and supplies it to the internal circuit, except for voltage source circuit 33 in integrated circuit 11.

As a result, with the constitution shown in FIG. 20, the power consumption can be cut.

As explained above, along with voltage source circuit 33, data interface part 41 and LED driver part 144 integrated in one integrated circuit 11 function at the regulator voltage generated based on anode voltage VA in the steady state after the start of integrated circuit 11.

Consequently, the power consumption of integrated circuit 11 can be reduced even in the steady state after integrated circuit 11, data interface part 41 and LED driver part 144 are started, as compared to the case when operation is continued at the regulator voltage generated based on power source voltage Vcc.

Figure 21:
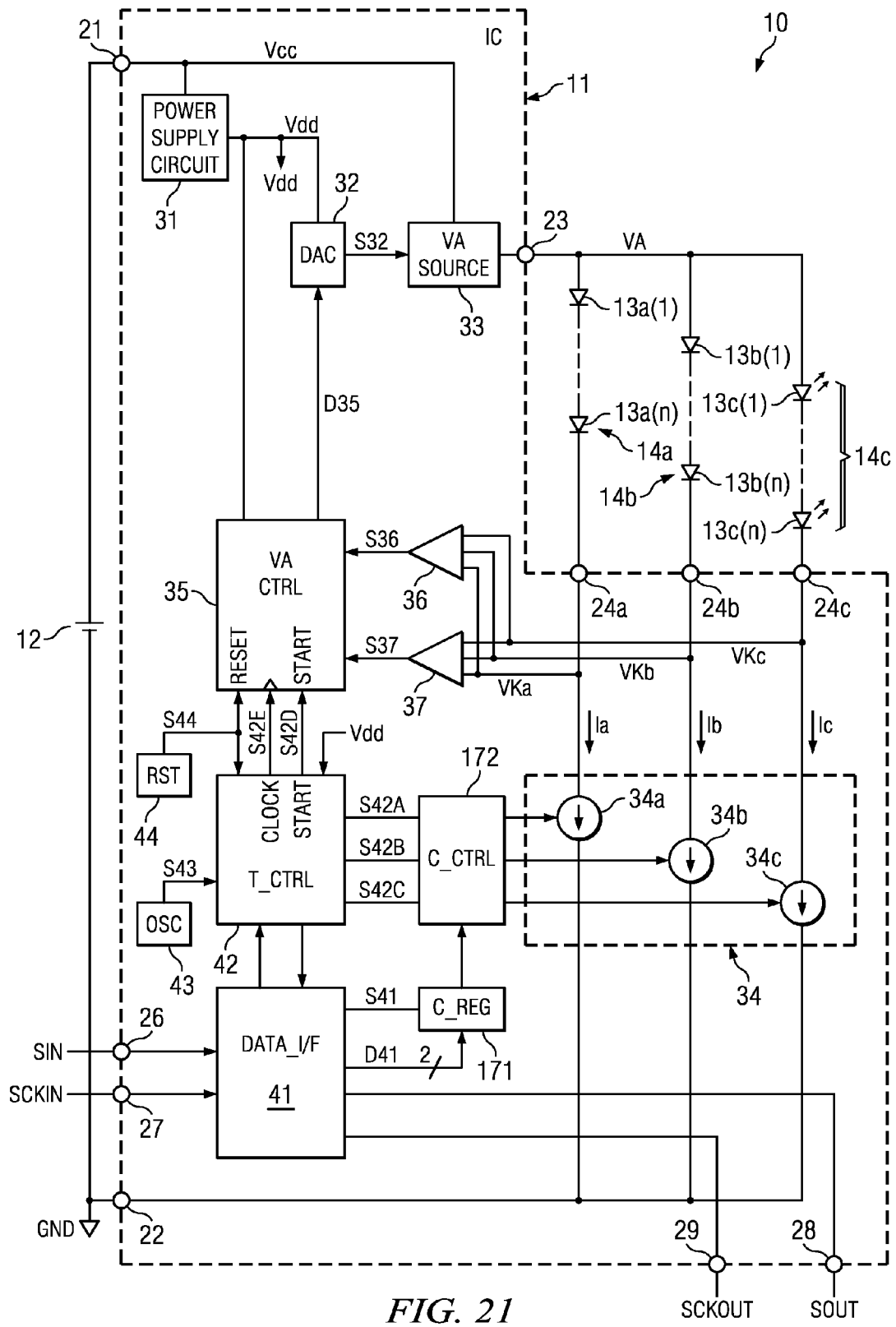
FIG. 21 is a schematic block diagram illustrating the light-emitting diode controller in accordance with an embodiment of the invention.

FIG. 21 is a schematic block diagram illustrating light-emitting diode controller 10. Here, light-emitting diode controller 10 shown in FIG. 21 differs from light-emitting diode controller 10 in FIG. 1 in that, in order to control the current values of currents Ia-Ic, it also has current register (C_REG) 171 and current controller (C_CTRL) 172.

Current register 171 is connected to data interface part 41.

The current register 171 stores the data received by data interface part 41 as the set value of currents Ia-Ic.

For example, current register 171 stores data of 7 bits or 21 bits.

Current controller 172 is connected to display timing controller 42, current register 171 and current source circuit 34.

The current controller 172 adjusts currents Ia-Ic flowing from constant current sources 34a-34c.

Here, when display timing controller 42 outputs constant current ON/OFF signals S42a-S42c, current source circuit 34 forms constant current sources 34a-34c.

Also, corresponding to the value stored in current register 171, current controller 172 changes currents Ia-Ic flowing in constant current sources 34a-34c.

As a result, the luminance of light-emitting diodes 13 can be changed corresponding to the data received by data interface part 41.

When dispersion is present in the luminance between plural light-emitting diode columns 14a-14c, the dispersion can be suppressed and uniform luminance can be obtained.

One may also adopt a scheme in which a plurality of current registers 171 is arranged, and one of the plural current registers 171 is selected and connected to current controller 172.

Although the present invention has been described in detail, it should be understood that various changes, substitutions and alterations can be made hereto without departing from the spirit and scope of the invention as defined by the appended claims.

What is claimed is:

1. An apparatus comprising:
   a plurality of light-emitting diode (LEDs), wherein each LED has an anode and a cathode;
   a voltage source circuit that is coupled to the anode of each LED;
   a current source circuit having a plurality of feed elements, wherein each feed element is coupled to the cathode of at least one of the LEDs;
   a first set of voltage detectors, wherein each voltage detector from the first set of voltage detectors is coupled to the cathode of at least one of the LEDs so as to compare the cathode voltage of its LED to a first reference voltage;
   a second set of voltage detectors, wherein each voltage detector from the second set of voltage detectors is coupled to the cathode of at least one of the LEDs so as to compare the cathode voltage of its LED to a second reference voltage, wherein the second reference voltage is less than the first reference voltage; and
   a voltage controller that is coupled to the voltage source circuit and to each voltage detector from the first and second sets of voltage detectors, wherein the voltage controller decreases the voltage supplied to the plurality of LEDs when each of the cathode voltages are greater than the first threshold voltage, and wherein the voltage controller decreases the voltage supplied to the plurality of LEDs when at least one of the cathode voltages is less than the second reference voltage.

2. The apparatus of claim 1, wherein the apparatus further comprises a third set of voltage detectors, wherein each voltage detector from the third set of voltage detectors is coupled to the cathode of at least one of the LEDs so as to compare the cathode voltage of its LED to a third reference voltage, and wherein the third reference voltage is greater than said first reference voltage, and wherein the detection result of the second voltage detector is ignored when at least one cathode voltage is greater than the third threshold voltage.

3. The apparatus of claim 2, wherein the apparatus further comprises a data interface that is coupled to the voltage controller, and wherein, the data interface is configured to transmit data indicating a state when the at least one cathode voltage is greater than the third threshold voltage.

4. The apparatus of claim 1, wherein the voltage controller further comprises an up/down counter that is coupled to at least one voltage detector from the first set of voltage detectors and to at least one voltage detector from the second set of voltage detectors, and wherein the apparatus further comprises a digital-to-analog converter (DAC) that that is coupled to the voltage controller and the voltage source circuit.

5. The apparatus of claim 4, wherein the voltage controller further comprises:
   an adder that is coupled to the up/down counter; and
   a selector that is coupled to the adder and the up/down counter.

6. An apparatus comprising:
   a first terminal;
   a second terminal;
   a third terminal;
   a first LED that is coupled between the first and second terminals;
   a second LED that is coupled between the first and third terminals;
   a sourcing circuit that is coupled to the first terminal;
   a first current source that is coupled to the second terminal;
   a second current source that is coupled to the third terminal;
   a detection circuit that is coupled to the second and third terminals, wherein the first detection circuit is configured to compare the voltages at the second and third terminals to a first reference voltage and a second reference voltage; and
   a controller that is coupled to the detection circuit and the sourcing circuit, wherein the controller decreases the voltage supplied to the first and second LEDs when the voltages at the second and third terminals are greater than the first reference voltage, and wherein the controller decreases the voltage supplied to the first and second LEDs when at least one the voltages on the second and third terminals is less than the second reference voltage.

7. The apparatus of claim 6, wherein the apparatus further comprises a DAC that is coupled between the controller and the sourcing circuit.

8. The apparatus of claim 7, wherein the detection circuit further comprises:
   a first voltage detection circuit that is coupled to the second and third terminals and that receives the first reference voltage; and a second voltage detection circuit that is coupled to the second and third terminals and that receives the second reference voltage.

9. The apparatus of claim 8, wherein the controller further comprises an up/down counter having an up terminal and a down terminal, wherein the first voltage detection circuit is coupled to the down terminal, and wherein the second voltage detection circuit is coupled to the up terminal.

10. The apparatus of claim 9, wherein the first voltage detection circuit further comprises:
    a first comparator that is coupled to the second terminal and that receives the first reference voltage;
    a second comparator that is coupled to the third terminal and that receives the first reference voltage; and
    an logic circuit that is coupled to the first and second comparators and the down terminal.

11. The apparatus of claim 9, wherein the logic circuit further comprises a first logic circuit, and wherein the second voltage detection circuit further comprises:
    a third comparator that is coupled to the second terminal and that receives the second reference voltage;
    a fourth comparator that is coupled to the third terminal and that receives the second reference voltage; and
    a second logic circuit that is coupled to the third and fourth comparators and the up terminal.

12. The apparatus of claim 11, wherein the first logic circuit is an AND gate, and wherein the second logic circuit is an OR gate.

13. The apparatus of claim 11, wherein the controller further comprises a third logic gate that is coupled between second logic circuit and the up terminal, and wherein the detection circuit further comprises a third voltage detection circuit having:
    a fifth comparator that is coupled to the second terminal and that receives a third reference voltage;
    a sixth comparator that is coupled to the third terminal and that receives the third reference voltage; and
    a fourth logic circuit that is coupled to the fifth and sixth comparators and the third logic circuit.

14. The apparatus of claim 13, wherein the first and third logic circuits are AND gates, and wherein the second logic circuit is an OR gate, and wherein the fourth logic circuit is a NOR gate.

15. The apparatus of claim 14, wherein each of the first and second LEDs further comprises a plurality of LEDs coupled in series with one another.

* * * * *